United States Patent
Ito

(10) Patent No.: US 10,084,963 B2
(45) Date of Patent: Sep. 25, 2018

(54) STAGE APPARATUS, IMAGE PROJECTOR APPARATUS HAVING STAGE APPARATUS, AND IMAGING APPARATUS HAVING STAGE APPARATUS

(71) Applicant: RICOH IMAGING COMPANY, LTD., Tokyo (JP)

(72) Inventor: Eiichi Ito, Chiba (JP)

(73) Assignee: RICOH IMAGING COMPANY, LTD., Tokyo (JP)

(*) Notice: Subject to any disclaimer, the term of this patent is extended or adjusted under 35 U.S.C. 154(b) by 29 days.

(21) Appl. No.: 15/362,059

(22) Filed: Nov. 28, 2016

(65) Prior Publication Data

US 2017/0155847 A1    Jun. 1, 2017

(30) Foreign Application Priority Data

Nov. 30, 2015 (JP) ................. 2015-232909
Nov. 22, 2016 (JP) ................. 2016-226906

(51) Int. Cl.
*H04N 5/232* (2006.01)
*F16M 13/02* (2006.01)
*F16M 11/18* (2006.01)

(52) U.S. Cl.
CPC ......... *H04N 5/23287* (2013.01); *F16M 11/18* (2013.01); *F16M 13/022* (2013.01)

(58) Field of Classification Search
CPC ............... H04N 5/23216; H04N 9/735; H04N 5/23296; H04N 5/23293
See application file for complete search history.

(56) References Cited

U.S. PATENT DOCUMENTS 5,157,563 A    10/1992 Nagasawa et al.
7,826,732 B2   11/2010 Enomoto
(Continued)

FOREIGN PATENT DOCUMENTS

JP    59-11071 A      1/1984
JP    H02-154313 A    6/1990
(Continued)

OTHER PUBLICATIONS

U.S. Appl. No. 15/361,190 to Eiichi Ito, filed Nov. 25, 2016.
U.S. Appl. No. 15/435,352 to Eiichi Ito, filed Feb. 17, 2017.
U.S. Appl. No. 15/434,483 to Eiichi Ito, filed Feb. 16, 2017.

*Primary Examiner* — Mekonnen Dagnew
(74) *Attorney, Agent, or Firm* — Greenblum & Bernstein, P.L.C.

(57) ABSTRACT

A stage apparatus includes a base member, a movable member which moves relative to the base member, thrust generators which generate thrust forces against the movable member, and a position detector which detects a translation position and a rotational position of the movable member relative to the base member. An interaction of the thrust forces causes the movable member to at least one of: translate, rotate, translate while rotating, and translate after rotating relative to the base member. The position detector includes permanent magnets fixed to one of the movable member and the base member, and pairs of magnetic sensors fixed to the other of the movable member and the base member. The position detector detects the translation position and the rotational position of the movable member relative to the base member based on detection signals input from the pairs of magnetic sensors.

18 Claims, 8 Drawing Sheets

(56) References Cited

U.S. PATENT DOCUMENTS

| | | |
|---|---|---|
| 9,288,394 B2 | 3/2016 | Yazawa |
| 2010/0305402 A1* | 12/2010 | Shachar .............. A61B 1/00158 |
| | | 600/118 |
| 2012/0268642 A1 | 10/2012 | Kawai |
| 2012/0293674 A1* | 11/2012 | Uenaka .............. H04N 5/23258 |
| | | 348/208.99 |
| 2013/0194442 A1 | 8/2013 | Yazawa |
| 2016/0072998 A1 | 3/2016 | Yazawa |

FOREIGN PATENT DOCUMENTS

| | | |
|---|---|---|
| JP | 08-265612 A | 10/1996 |
| JP | 2008-035308 A | 2/2008 |
| JP | 2012-226205 A | 11/2012 |
| JP | 2013-160806 A | 8/2013 |

* cited by examiner

STAGE APPARATUS, IMAGE PROJECTOR APPARATUS HAVING STAGE APPARATUS, AND IMAGING APPARATUS HAVING STAGE APPARATUS

BACKGROUND OF THE INVENTION

1. Field of the Invention

The present invention relates to a stage apparatus capable of detecting the position of a movable member with precision and also relates to an image projector apparatus and an imaging apparatus each having this stage apparatus.

2. Description of the Related Art

A shake reduction (image shake correction/image stabilizing/anti-shake) system designed as an in-body shake reduction system which drives an image sensor in a camera body of an SLR camera system to perform an image shake correction operation is known in the art, wherein the image sensor is driven in the X-direction (the X-axis direction) and the Y-direction (the Y-axis direction), which are orthogonal to an optical axis, using oblong-shaped planar drive coils and permanent magnets, and the image sensor is also driven in the Z-direction (the Z-axis direction), which coincides with the optical axis direction, by a piezoelectric actuator. This type of shake reduction system is disclosed in Patent Literature 1.

It is known in the art for this type of related-art shake reduction system to be equipped with a position detector in which a Hall sensor is provided in the air-core area of each drive coil in order to detect the positions of the image sensor in the X-direction and the Y-direction in a plane (optical-axis-orthogonal plane) orthogonal to the optical axis of the image sensor and the rotational angle of the image sensor in this orthogonal plane.

[Patent Literature 1] Japanese Unexamined Patent Publication No. 2012-226205

However, when the image sensor is driven in the Z-direction (along the optical axis), a variation in position of the image sensor in the Z-direction causes the distance between each Hall sensor and the associated permanent magnet(s) to vary, thus causing the magnetic flux density to vary. This variation causes the output of each Hall sensor to vary, which makes it difficult to detect the positions of the image sensor in the X-direction and the Y-direction with precision. In addition, variations in position of the image sensor in the X-direction and the Y-direction make it difficult to detect the position of the image sensor in the Z-direction with high precision.

SUMMARY OF THE INVENTION

The present invention has been devised in view of the above described issues, and the present invention provides a stage apparatus capable of detecting the position of a movable member with precision even when the movable member is translated or rotated (tilted or turned), and the present invention also provides an image projector apparatus and an imaging apparatus each having this stage apparatus.

According to an aspect of the present invention, a stage apparatus is provided, including a base member, a movable member configured to move relative to the base member, a plurality of thrust generators configured to generate thrust forces in different directions against the movable member, and a position detector configured to detect a translation position and a rotational position of the movable member relative to the base member. An interaction of the thrust forces in the different directions causes she movable member to at least one of: translate relative to the base member, rotate relative to the base member, translate while rotating relative to the base member, and translate after rotating relative to the base member. The position detector includes permanent magnets fixed to one of the movable member and the base member, and pairs of magnetic sensors fixed to the other of the movable member and the base member. The position detector is configured to detect the translation position and the rotational position of the movable member relative to the base member based on detection signals input from the pairs of magnetic sensors.

It is desirable for the thrust generators to include a plurality of first thrust generators which generate thrust forces in a first direction. An interaction of the thrust forces in the first direction causes the movable member to at least one of: translate relative to the base member in the first direction, rotate relative to the base member about a direction different from the first direction, translate relative to the base member in the first direction while rotating relative to the base member about the direction different from the first direction, and translate relative to the base member in the first direction after rotating relative to the base member about the direction different from the first direction. The pairs of magnetic sensors include at least one pair of first-direction magnetic sensors configured to detect a magnetic force of a first-direction permanent magnet of the permanent magnets, the pairs of magnetic sensors fixed to the other of the movable member and the base member while being spaced from each other with a predetermined distance therebetween in the first direction. The position detector detects the translation position of the movable member based on a pair of detection signals input from the pair of first-direction magnetic sensors.

It is desirable for the thrust generators to include a second thrust generator and a third thrust generator which generate thrust forces in a second direction and a third direction, respectively, that are mutually different and different from the first direction. An interaction of the thrust forces in the second direction and the third direction causes the movable member to at least one of: translate in the second direction, translate in the third direction, and rotate about the first direction. The permanent magnets include a second-direction permanent magnet and a third-direction permanent magnet. The pairs of magnetic sensors include at least one pair of second-direction magnetic sensors which are fixed to the other of the movable member and the base member and spaced from each other with a predetermined distance therebetween in the second direction to detect magnetic force of the second-direction permanent magnet. The pairs of magnetic sensors include at least one pair of third-direction magnetic sensors which are fixed to the other of the movable member and the base member and spaced from each other with a predetermined distance therebetween in the third direction to detect magnetic force of the third-direction permanent magnet. The position detector detects a translation position of the movable member in the second direction based on a pair of detection signals input from the pair of second-direction magnetic sensors. The position detector detects a translation position of the movable member in the third direction based on a pair of detection signals input from the pair of third-direction magnetic sensors.

It is desirable for at least one of the second thrust generator and the third thrust generator to include at least two thrust generators. The movable member can be rotated about the first direction by interaction of the thrust forces in one of the second direction and the third direction generated by the at least two thrust generators.

It is desirable for a plurality of the position detectors that are each configured of the pair of second-direction magnetic sensors to detect the rotational position of the movable member about the first direction based on detection signals input from the pairs of second-direction magnetic sensors of the plurality of position detectors.

It is desirable for a plurality of the position detectors that are configured of the pair of third-direction magnetic sensors to detect the rotational position of the movable member about the first direction based on detection signals input from the pairs of third-direction magnetic sensors of the plurality of position detectors.

It is desirable for the movable member to be levitated in a noncontact state with the base member by interaction of the thrust forces in the different directions.

It is desirable for a driven member having a flat front surface and a low-profile shape to be fixed to the movable member, wherein the first direction is orthogonal to the flat front surface, and the second direction and the third direction are orthogonal to each other, orthogonal to the first direction, and parallel to the flat front surface.

It is desirable for the base member to include a front fixed yoke and a rear fixed yoke which face the movable member from front and rear thereof, respectively. The thrust generators include a plurality of drive coils fixed to one of the movable member and the front and rear fixed yokes, and a plurality of permanent magnets fixed to the other of the movable member and the front and rear fixed yokes. The pairs of magnetic sensors are positioned in air-core areas of the drive coils to detect magnetic force of the permanent magnets fixed to the other of the movable member and the front and rear fixed yokes.

It is desirable for the first thrust generators to include drive coils and permanent magnets arranged at least three substantially equi-distant positions outside of the driven member in a radial direction from an axis extending through a center of the driven member in the first direction, and circumferentially arranged at equi-angular intervals about the axis.

It is desirable for the drive coils to include circular and flat drive coils which are fixed to the movable member. Each pair of the pairs of first-direction magnetic sensors are positioned in the air-core area of associated one of the circular and flat drive coils to be spaced from each other with a predetermined distance therebetween in the first direction.

It is desirable for the drive coils to include circular and flat drive coils which are fixed to the front fixed yoke and the rear fixed yoke. Each pair of the pairs of first-direction magnetic sensors are positioned in the air-core areas of associated two of the circular and flat drive coils which are fixed to the front fixed yoke and the rear fixed yoke, respectively.

It is desirable for the permanent magnets to be arranged on the front fixed yoke and the rear fixed yoke so that same magnetic poles of the permanent magnets are placed face-to-face.

It is desirable for the position detector to detect a position of the movable member in the first direction and a tilting position of the movable member about one of the second direction and the third direction based on the quotient of the sum of a pair of detection signals of the pairs of first-direction magnetic sensors and the difference between the pair of detection signals.

It is desirable for the drive coils and the permanent magnets of each of the second thrust generator and the third thrust generator to be positioned outside of the driven member in a radial direction from an axis extending through a center of the driven member in the first direction. Each drive coil of the second thrust generator includes a first elongated flat drive coil elongated in a direction orthogonal to the second direction. The permanent magnets of the second thrust generator, which face the drive coils of the second thrust generator, each include two plate-like permanent magnets which extend parallel to each other in the elongated direction of the first elongated flat drive coil and are spaced from each other in a short-side direction of the first elongated flat drive coil. Each drive coil of the third thrust generator includes a second elongated flat drive coil elongated in a direction orthogonal to the third direction. The permanent magnets of the third thrust generator, which face the drive coils of the third thrust generator, each include two plate-like permanent magnets which extend parallel to each other in the elongated direction of the second elongated flat drive coil and are spaced from each other in a short-side direction of the second elongated flat drive coil. The pair of second-direction magnetic sensors are positioned in the air-core area of the first elongated flat drive coil to be spaced from each other with a predetermined distance therebetween in the short-side direction of the first elongated flat drive coil. The pair of third-direction magnetic sensors are positioned in the air-core area of the second elongated flat drive coil to be spaced from each other with a predetermined distance therebetween in the short-side direction of the second elongated flat drive coil.

It is desirable for the position detector to detect a position of the movable member in the second direction based on the sum of a pair of detection signals input from the pair of second-direction magnetic sensors, and for the position detector to detect a position of the movable member in the third direction based on the sum of a pair of detection signals input from the pair of third-direction magnetic sensors.

It is desirable for at least one of the second thrust generator and the third thrust generator to include a pair of thrust generators spaced from each other in a direction orthogonal to one of the second direction and the third direction. The position detector detects the rotational position of the movable stage about the first direction based on the sum of detection signals input from one of the pair of second-direction magnetic sensors and the pair of third-direction magnetic sensors and the sum of detection signals input from the other of the pair of second-direction magnetic sensors and the pair of third-direction magnetic sensors.

It is desirable for the drive coils and the pairs of magnetic sensors to be mounted to the movable member, and for the permanent magnets to be mounted to the front fixed yoke and the rear fixed yoke.

It is desirable for the drive coils to be positioned to face the front fixed yoke and the rear fixed yoke. The pairs of magnetic sensors are positioned in the air-core areas of the drive coils fixed to one of the front fixed yoke and the rear fixed yokes. The permanent magnets are fixed to the movable member.

In an embodiment, an imaging apparatus is provided, including a photographing optical system; an image sensor configured to image an object image that is made incident thereon via the photographing optical system; a base member; a movable member configured to move relative to the base member and to which the image sensor is fixed; a plurality of thrust generators configured to generate thrust forces in different directions against the movable member; and a position detector configured to detect a translation position and a rotational position of the movable member relative to the base member. An interaction of the thrust forces in the different directions causes the movable member to at least one of: translate relative to the base member, rotate relative to the base member, translate while rotating relative to the base member, and translate after rotating relative to the base member. The position detector includes permanent magnets fixed to one of the movable member and the base member, and pairs of magnetic sensors fixed to the other of the movable member and the base member. The position detector is configured to detect the translation position and the rotational position of the movable member relative to the base member based on detection signals input from the pairs of magnetic sensors.

The stage apparatus according to the present invention can precisely detect the positions of the movable member in the translation direction and the rotating direction (tilting or turning direction) relative to the base member even when the movable member is translated, rotated, rotated while being translated, or translated after being rotated.

An image projector apparatus equipped with the stage apparatus according to the present invention can adjust the image projecting direction with high precision.

An imaging apparatus equipped with the stage apparatus according to the present invention can adjust the position of the image sensor in a direction (s) orthogonal to the optical axis of the image sensor and the tilting angle of the image sensor with high precision.

The present disclosure relates to subject matter contained in Japanese Patent Application No. 2015-232909 (filed on Nov. 30, 2015) and Japanese Patent Application No. 2016-226906 (filed on Nov. 22, 2016) which are expressly incorporated herein by reference in their entireties.

BRIEF DESCRIPTION OF THE DRAWINGS

The present invention will be described below in detail with reference to the accompanying drawings in which.

DESCRIPTION OF THE PREFERRED EMBODIMENTS

Figure 1:
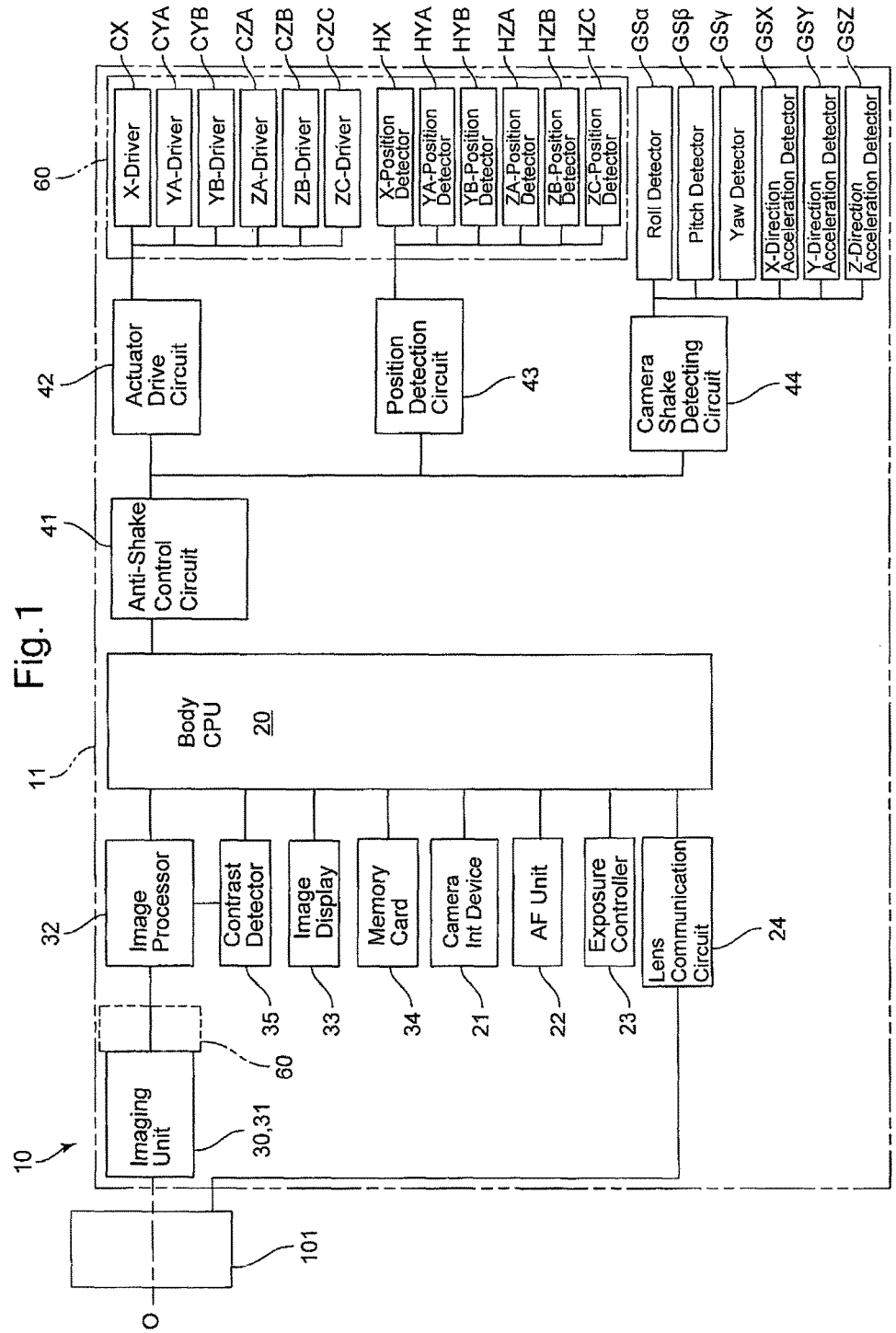
FIG. 1 is a block diagram illustrating main components of a digital camera which incorporates an imaging apparatus equipped with a stage apparatus according to the present invention.

Embodiments of the present invention will be hereinafter discussed with reference to FIGS. 1 through 10. FIG. 1 is a conceptual block diagram of main components and main circuit elements of a digital camera which incorporates an imaging apparatus equipped with a stage apparatus according to the present invention. In the diagram of FIG. 1, the direction parallel to a photographing optical axis O (which includes the concept of a direction aligned with the photographing optical axis O) is defined as the first direction (Z-direction/Z-axis direction), a direction orthogonal to the first direction is defined as the second direction (X-direction/X-axis direction), and a direction orthogonal to both the first direction (Z-direction) and the second direction (X-direction) is defined as the third direction (Y-direction/Y-axis direction). When the photographing optical axis O is defined as the Z-axis, two axes orthogonal to the Z-axis are regarded as the X-axis and the Y-axis. When the camera is in a normal position (horizontal position), the first direction (Z-direction/Z-axis) and the second direction (X-direction/X-axis) are defined as horizontal directions and the third direction (Y-direction/Y-axis) is defined as a vertical direction, and the object side and the direction toward the object defines a front side (of the imaging apparatus) and a forward direction, respectively. Furthermore, in the present disclosure, rotation about the Z-direction (first direction) refers to rotation about an imaginary axis that is parallel to the Z-axis. Similarly, rotation about the X-direction (second direction) refers to rotation about an imaginary axis that is parallel to the X-axis, and rotation about the Y-direction (third direction) refers to rotation about an imaginary axis that is parallel to the y-axis. Additionally, in the present specification, turning (rotation) about an imaginary axis in the first direction denotes turning with an imaginary axis parallel to (extending in) the first direction as an imaginary rotational center, tilting (rotation) about an imaginary axis in the second direction denotes tilting with an imaginary axis parallel to (extending in) the second direction as a rotational center, and tilting (rotation) about an imaginary axis in the third direction denotes tilting with an imaginary axis parallel to (extending in) the third direction as a rotational center.

The digital camera 10 is provided with a camera body 11 and a photographic lens 101 as a photographing optical system. The digital camera 10 is provided in the camera body 11 with a body CPU 20 and an imaging unit 30. The body CPU 20 controls the overall operations of the camera, performs computational and arithmetic operations, and controls driving of the camera 10. The imaging unit 30 is provided with an image sensor (image pickup device) 31, onto which an object image is projected (made incident) via the photographic lens 101. The body CPU 20 controls driving of the image sensor 31, processes image signals of captured object images at an image processor 32 to display the captured object images on an image display (monitor) 33, and writes data of the captured object images onto a memory card 34.

The digital camera 10 is provided with a contrast detector 35, a camera input device 21, an AF Unit 22, an exposure controller 23 and a lens communication circuit 24. The contrast detector 35 detects the contrast of an object image from the image signal processed by the image processor 32. The camera input device 21 includes, e.g., control switches, buttons, a dial(s) and/or a touchscreen, which are manually operated by the user to operate all the functions of the camera. The AF Unit 22 drives a focusing optical system (not shown), contained in the photographic lens 101, in the optical axis direction (the direction along the optical axis O) to adjust the focus. The exposure controller 23 controls opening and closing operations of a diaphragm, a shutter, etc., to adjust the quantity of light incident on the image sensor 31 and drives the image sensor 31 to control imaging operations. The lens communication circuit 24 performs communications with the photographic lens 101 to input information on the focal length, etc., of the photographic lens 101.

The digital camera 10 is provided with a roll detector GSα (which detects turning (rotation) about the Z-direction), a pitch detector GSβ (which detects tilt (rotation) about the X-direction), a yaw detector GSγ (which detects tilt (rotation) about the Y-direction), an X-direction acceleration detector GSX, a Y-direction acceleration detector GSY and a Z-direction acceleration detector GSZ as detectors for detecting shaking (vibrations) of the camera body 11 that is caused by hand shake; each of these six detectors are connected to a camera shake detecting circuit 44. These six detectors can be provided as a combined sensor, e.g., a six-axis sensor, a triple-axis gyro sensor, or a triple-axis acceleration sensor.

The imaging unit 30 is provided with a stage apparatus 60. The stage apparatus 60 is provided with a movable stage 61, a front fixed yoke 62 and a rear fixed yoke 63. The image sensor 31 is fixedly mounted to the movable stage 61, and the front fixed yoke 62 and the rear fixed yoke 63 are positioned in front of and behind the movable stage 61, respectively. The stage apparatus 60 levitationally supports the movable stage 61 (so that the movable stage 61 is magnetically levitated) relative to the front fixed yoke 62 and the rear fixed yoke 63 at least when energized. The image sensor 31 constitutes a low-profile driven member having a flat front surface. In a levitational state, the movable stage 61 of the stage apparatus 60 can translate (linearly move) in the Z-direction (the first direction), translate in the X-direction (second direction) which is orthogonal to the Z-direction, translate in the Y-direction (third direction) which is orthogonal to both the X-direction and the Z-direction, tilt (rotate) about the X-direction (second direction), tilt (rotate) about the Y-direction (third direction), and turn (rotate) about the Z-direction (first direction) to thereby exhibit six axes of motion/motion with six degrees of freedom (6DoF) (see FIGS. 2 through 5). Accordingly, the movable stage 61 of the stage apparatus 60 can translate, rotate, translate while rotating, translate after rotating, rotate after translating, and/or perform a combination of such translating and rotating operations. In the present disclosure, the term "translate" refers to moving along at least one of the X-direction, Y-direction and Z-direction without changing either the orientation or angular displacement of the image plane, corresponding to the light-receiving surface of the image sensor 31 provided on the movable stage, relative to the camera body 11, the term "tilt" refers to rotating about at least one of the X-direction and Y-direction to change the orientation of the image plane relative to the camera body 11, and the term "turn" refers to rotating about the Z-direction so that the image plane rotates about the optical axis O. In addition, the term "levitation" includes the concept of holding the movable stage 61 between the front fixed yoke 62 and the rear fixed yoke 63 in a noncontact state with the front fixed yoke 62 and the rear fixed yoke 63 so that the movable stage 61 is held against the force of gravity in a levitated state (levitated and stationary state), and the concept of holding the movable stage 61 between the front fixed yoke 62 and the rear fixed yoke 63 in a noncontact state with the front fixed yoke 62 and the rear fixed yoke 63 at a center position (imaging initial position) where the center of the image sensor 31 is coincident with the optical axis O (the Z-axis).

The body CPU 20 inputs information on the focal length f from the photographic lens 101 via, e.g., the lens communication circuit 24, calculates the vibration direction, the vibration speed, etc., of the digital camera 10 based on detection signals input from the pitch (tilt (rotation) about the X-direction) detector GSβ, the yaw (tilt (rotation) about the Y-direction) detector GSγ, the roll (turn (rotation) about the Z-direction) detector GSα, the X-direction acceleration detector GSX, the Y-direction acceleration detector GSY and the Z-direction acceleration detector GSZ, calculates the driving direction, the driving speed and the driving amount of the image sensor 31 so that the object image projected onto the image sensor 31 via the photographic lens 101 does not move relative to the image sensor 31 and drives the movable stage 61 of the stage apparatus 60 in with six degrees of freedom (6DoF) (six-axis motion), i.e., move (translate) the movable member in the X-direction, the Y-direction and/or the Z-direction, tilt (rotate) the movable member about the X-direction and/or the Y-axis, and/or turn (rotate) the movable member about the Z-direction, based on the calculation results. For example, the movable stage 61 can translate, rotate (tilt or turn), translate while rotating, translate after rotating, and rotating after translation. The order of these movements is optional.

The stage apparatus 60 functions as a supporter which supports the movable stage 61, to which the image sensor 31 is fixed, in a manner to allow the movable stage 61 to translate and rotate (tilt or turn) with six degrees of freedom (6DoF) with respect to the front fixed yoke 62 and the rear fixed yoke 63. The movable stage 61 is a rectangular plate (frame) and greater in size than the image sensor 31 as viewed from the front. The front fixed yoke 62 and the rear fixed yoke 63 are rectangular plates (frames) of the same size and have slightly greater outer dimensions than those of the movable stage 61 in a plan view. The front fixed yoke 62 and the rear fixed yoke 63 are provided at the centers thereof with rectangular openings 62a and 63a, respectively, which have greater dimensions than the outer dimensions of the image sensor 31 as viewed from front (as viewed in the Z-direction). The front fixed yoke 62 and the rear fixed yoke 63 are connected and held in parallel with each other with a predetermined distance therebetween via a plurality of connecting columns (not shown) at positions not interfering with the movable stage 61 even when the movable stage 61 is moved (translated, tilted or turned) within a predetermined range.

Figure 2A:
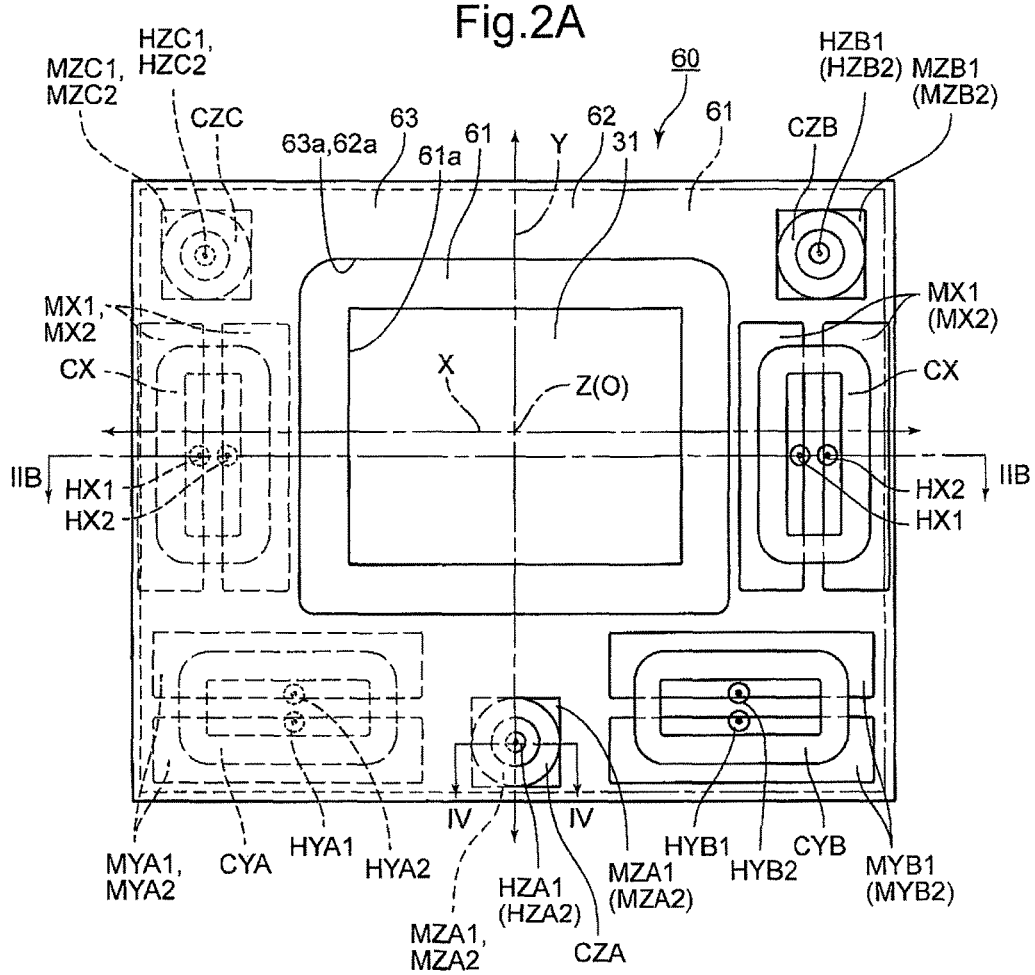
FIG. 2A is a rear elevational view of an embodiment of the stage apparatus with six degrees of freedom according to the present invention, wherein a rear yoke and a movable stage are not shown in a right half of FIG. 2A.
Figure 2B:
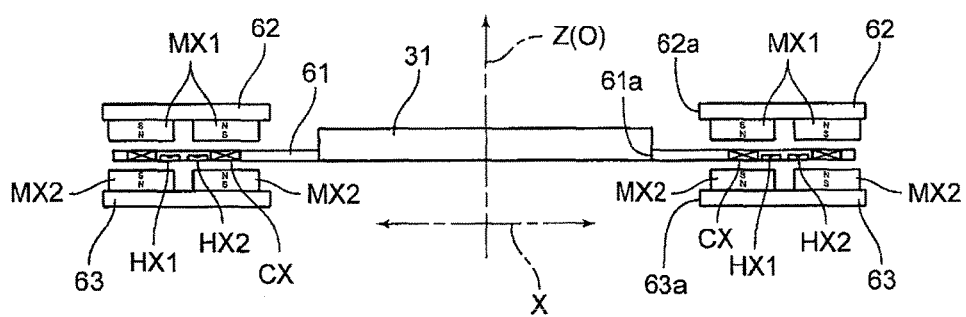
FIG. 2B is a sectional view taken along the section line IIB-IIB shown in FIG. 2A.
Figure 3:
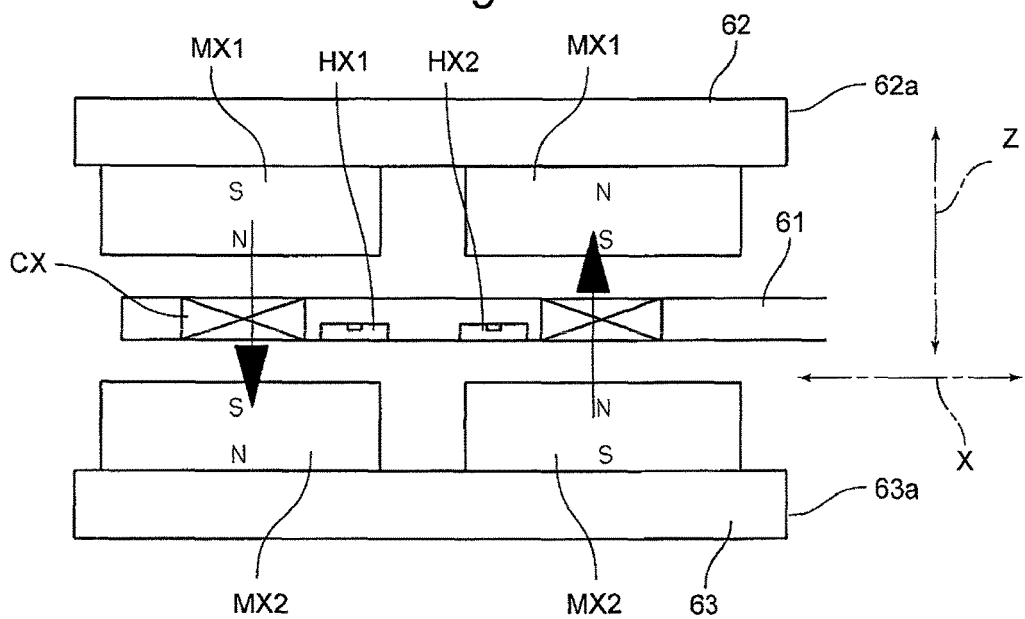
FIG. 3 is an enlarged sectional view of one of a pair of X-drivers shown in FIG. 2B.
Figure 4:
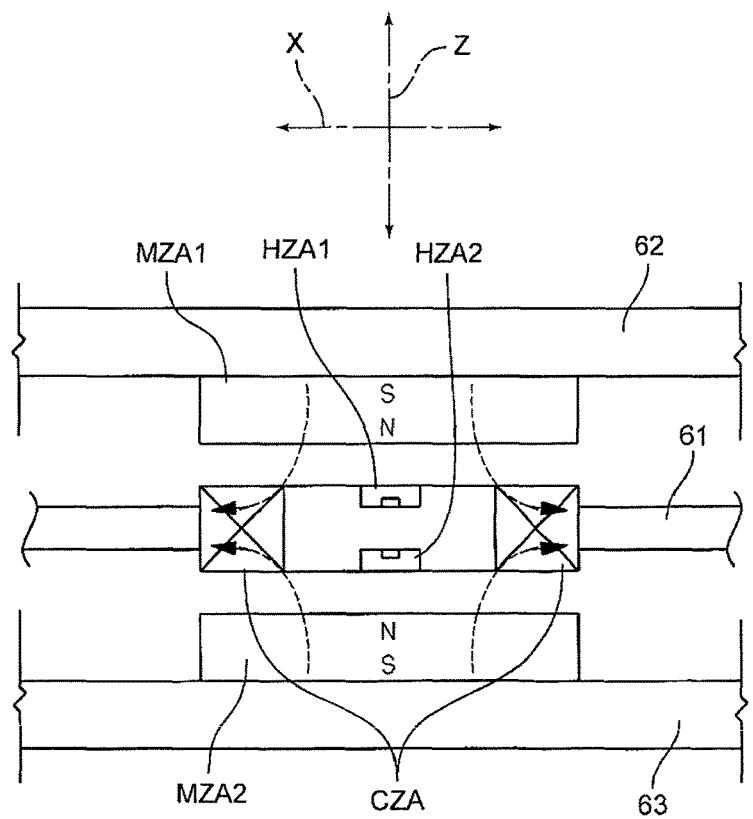
FIG. 4 is an enlarged sectional view taken along the section line IV-IV shown in FIG. 2A.
Figure 5:
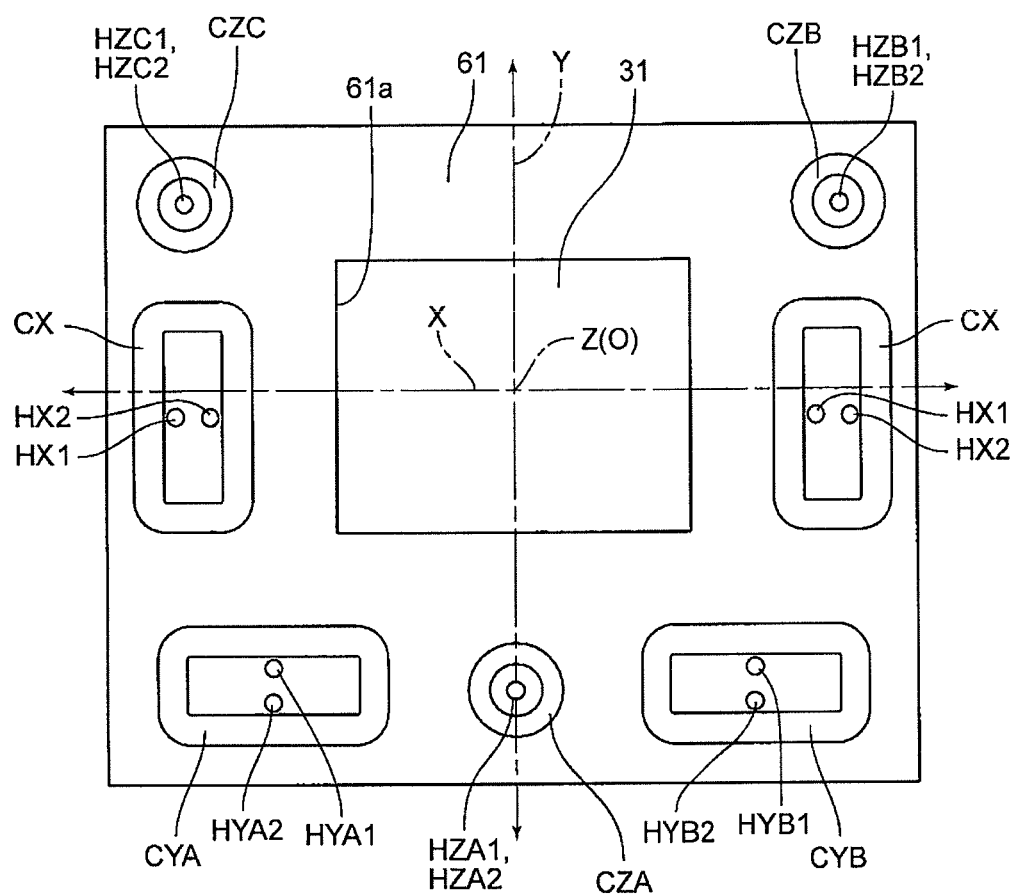
FIG. 5 is a rear elevational view of the movable stage.

The stage apparatus 60 is provided with a left pair of X-direction magnets (second-direction magnets/left and right X-direction magnets) MX1 and a right pair of X-direction magnets (second-direction magnets/left and right X-direction magnets) MX1, each pair being made of two permanent magnets identical in specification. The left pair of X-direction magnets MX1 and the right pair of X-direction magnets MX1 are fixed to the rear of the front fixed yoke 62 (the opposite side of the front fixed yoke 62 from the object side) to be positioned on either side of the opening 62a with respect to the leftward and rightward directions (on either side of the Z-axis with the Y-axis as a center line). Although the stage apparatus 60 is provided with the two pairs of X-direction magnets MX1 on either side of the opening 62a in the X-direction in the present embodiment of the stage apparatus, it is possible for the two pairs of X-direction magnets MX1 to be provided only on one side of the opening 62a with respect to the X-direction. The stage apparatus 60 is provided with a left pair of X-direction magnets MX2 and a right pair of X-direction magnets MX2 which are fixed to the front of the front fixed yoke 63 (the object side surface of the front fixed yoke 63) to face the left pair of X-direction magnets MX1 and the right pair of X-direction magnets MX1, respectively. Each pair of X-direction magnets MX2 is identical in specification to each pair of X-direction magnets MX1. Each X-direction magnet MX1 and MX2 is a plate-like magnet which is elongated in the Y-direction and thin in the Z-direction. The left and right X-direction magnets MX1 of each pair are arranged parallel to the Y-axis and spaced from each other in the X-direction; likewise, the left and right X-direction magnets MX2 of each pair are arranged parallel to the Y-axis and spaced from each other in the X-direction. In each pair of X-direction magnets MX1, the front and the rear sides of one X-direction magnet MX1 (the left X-direction magnet MX1 with respect to FIG. 2B) are the north pole and the south pole, respectively, while the front and the rear sides of the other X-direction magnet MX1 (the right X-direction magnet MX1 with respect to FIG. 2B) are the south pole and the north pole, respectively. Each pair of X-direction magnets MX2 are positioned with respect to the associated pair of X-direction magnets MX1 so that opposite magnetic poles are placed face-to-face in the Z-direction as shown in FIGS. 2B and 3. With the passage of magnetic flux of each pair of X-direction magnets MX1 and the associated pair of X-direction magnets MX2 through the front fixed yoke 62 and the rear fixed yoke 63, a portion of a magnetic circuit which generates thrust in the X-direction (the second direction) is formed between each pair of X-direction magnets MX1 and the associated pair of X-direction magnets MX2 (see FIG. 3). The left and right pairs of X-direction magnets MX1 and the left and right pairs of X-direction magnets MX2 also act (function) as a levitator which levitates and holds the movable stage 61 at a center position (initial position) regardless of the attitude of the camera body 11, e.g., when the camera is held in a vertical position in which the grip of the camera body 11 faces up or down, or at an inclined angle other than a horizontal position.

The stage apparatus 60 is provided with a left pair of Y-direction magnets (upper and lower Y-direction magnets) MYA1 and a right pair of Y-direction magnets (upper and lower Y-direction magnets) MYB1, each pair being made of two permanent magnets identical in specification. The left pair of Y-direction magnets MYA1 and the right pair of Y-direction magnets MYB1 are fixed to the rear of the front fixed yoke 62 to be positioned below the opening 62a (to be spaced downward from the Z-axis with the Y-axis as a center line). The stage apparatus 60 is further provided with a left pair of Y-direction magnets (upper and lower Y-direction magnets) MYA2 and a right pair of Y-direction magnets (upper and lower Y-direction magnets) MYB2, each pair being made of two permanent magnets identical in specification. The left pair of Y-direction magnets MYA2 and the right pair of Y-direction magnets MYB2 are fixed to the front of the rear fixed yoke 63 to face the left pair of Y-direction magnets MYA1 and the right pair of Y-direction magnets MYB1, respectively. Each Y-direction magnet MYA1, MYB1, MYA2 and MYB2 is a plate-like magnet which is elongated in the X-direction and thin in the Z-direction. The upper and lower Y-direction magnets MYA1 are arranged parallel to the X-axis and spaced from each other in the Y-direction and the upper and lower Y-direction magnets MYB1 are arranged parallel to the X-axis and spaced from each other in the Y-direction. Likewise, the upper and lower Y-direction magnets MYA2 are arranged parallel to the X-axis and spaced from each other in the Y-direction and the upper and lower Y-direction magnets MYB2 are arranged parallel to the X-axis and spaced from each other in the Y-direction. In each pair of Y-direction magnets MYA1 and MYB1, the front and the rear of one Y-direction magnet MYA1 or MYB1 (the upper Y-direction magnet MYA1 or MYB1 with respect to FIG. 2A) are the south pole and the north pole, respectively, while the front and the rear of the other Y-direction magnet MYA1 or MYB1 (the lower Y-direction magnet MYA1 or MYB1 with respect to FIG. 2A) are the north pole and the south pole, respectively. Each pair of Y-direction magnets MYA2 and MYB2 are positioned with respect to the associated pair of Y-direction magnets MYA1 and MYA2 so that opposite magnetic poles are placed face-to-face in the Z-direction. With the passage of magnetic flux of each pair of Y-direction magnets MYA1 and the associated pair of Y-direction magnets MYA2 through the front fixed yoke 62 and the rear fixed yoke 63, a portion of a magnetic circuit which generates thrust in the Y-direction (the third direction) is formed between each pair of Y-direction magnets MYA1 and the associated pair of Y-direction magnets MYA2. The left and right pairs of Y-direction magnets MYA1 and the left and right pairs of Y-direction magnets MYA2 also act (function) as a levitator which levitates and holds the movable stage 61 at a center position (initial position) regardless of the attitude of the camera body 11, and especially when the camera is held in a normal position (horizontal position).

The stage apparatus 60 is further provided on the rear of the front fixed yoke 62 with three Z-direction magnets MZA1, MZB1 and MZC1 (see FIG. 2A), at three positions different from the positions of the left pair of X-direction magnets MX1, the right pair of X-direction magnets MX1, the left pair of Y-direction magnets MYA1 and the right pair of Y-direction magnets MYB1. The stage apparatus 60 is provided on the front of the rear fixed yoke 63 with three Z-direction magnets MZA2, MZB2 and MZC2.

Each Z-direction magnet MZA1, MZB1, MZC1, MZA2, MZB2 and MZC2 is a plate-like magnet which is rectangular (substantially square) in shape as viewed from the front. The Z-direction magnets MZA1, MZB1 and MZC1 are fixed to the rear side of the front fixed yoke 62 so that the front side (that is in contact with the front fixed yoke 62) and the rear side of each Z-direction magnet act as the south pole and the north pole, respectively (i.e., the south and north poles of each Z-direction magnet face forward and rearward, respectively), while the Z-direction magnets MZA2, MZB2 and MZC2 are fixed to the front of the rear fixed yoke 63 so that the same magnetic poles are placed face-to-face between each Z-direction magnet MZA2, MZB2 and MZC2 and the associated Z-direction magnet MZA1, MZB1 or MZC1. The Z-direction magnets MZA1, MZB1, MZC1, MZA2, MZB2 and MZC2 are identical in specification. In addition, the Z-direction magnets MZA1, MZB1 and MZC1 lie in a plane (first plane) orthogonal to the Z-axis and are arranged at substantially equi-angular intervals about the Z-axis. Likewise, the Z-direction magnets MZA2, MZB2 and MZC2 lie in a plane (second plane parallel to the aforementioned first plane) orthogonal to the Z-axis and are arranged at substantially equi-angular intervals about the Z-axis to face the Z-direction magnets MZA1, MZB1 and MZC1 in the Z-direction, respectively. With the passage of magnetic flux of each Z-direction magnet MZA1, MZB1 and MZC1 and the associated Z-direction magnet MZA2, MZB2 or MZC2 through the front fixed yoke 62 and the rear fixed yoke 63, a portion of a magnetic circuit which generates thrust in the Z-direction (the first direction) is formed between each Z-direction magnet MZA1, MZA2 and MZA3 and the associated Z-direction magnet MZB1, MZB2 or MZBC.

The movable stage 61, which is positioned between the front fixed yoke 62 and the rear fixed yoke 63, is a nonmagnetic member which is formed of a nonmagnetic material as a single-piece member by press-molding. The movable stage 61 is provided at a central portion thereof with an image sensor mounting hole 61a, having the shape of a rectangle as viewed from the front, and the image sensor 31 is fitted into the image sensor mounting hole 61a and fixed thereto. The image sensor 31 protrudes from the image sensor mounting hole 61a forwardly toward the front of the movable stage 61 in the optical axis direction.

When the movable stage 61 sits at the initial position (with the movable stage 61 magnetically levitated), the image sensor 31 is positioned so that the long sides of the image sensor 31 extend parallel to the X-axis and so that the short sides of the image sensor 31 extend parallel to the Y-axis. When the movable stage 61 sits at the initial position, the center of the imaging surface of the image sensor 31 is positioned on the optical axis O of the photographic lens 101, and the optical axis O and the Z-axis are aligned with each other. The Z-direction (the first direction), the X-direction (the second direction) and the Y-direction (the third direction) will be hereinafter described as fixed directions with respect to the camera body 11 and the photographic lens 101, with the Z-direction parallel to (including being aligned with) the optical axis O; however, the Z-direction (the first direction), the X-direction (the second direction) and the Y-direction (the third direction) can be fixed directions with respect to the image sensor 31.

The stage apparatus 60 is provided with a pair of X-drive coils (X-driver) CX which are fixed to the movable stage 61 on either side (left and right sides) of the image sensor 31 in the X-direction to be located to the left and right of the left and right sides (short sides) of the image sensor 31, respectively. The stage apparatus 60 is provided with a pair of Y-drive coils: a Y-drive coil (YA-driver) CYA and a Y-drive coil (YB-driver) CYB which are fixed to the movable stage 61 to be located below the lower side (long side) of the image sensor 31 and to be spaced from each other in the leftward and rightward directions (i.e., in the X-direction). The pair of X-drive coils (X-driver) CX are vertically elongated in the Y-direction and arranged at symmetrical positions with respect to the Y-axis (at equi-distant positions from the Y-axis) so that the longitudinal directions of the pair of X-drive coils CX extend parallel to the Y-direction and intersect the X-axis. The pair of Y-drive coils CYA and CYB are laterally elongated in the X-direction and arranged at symmetrical positions with respect to the Y-axis (at equi-distant positions from the Y-axis) so that the longitudinal directions of the pair of Y-drive coils CYA and CYB extend parallel to the X-direction. According to this arrangement, manufacture, adjustment and control of the stage apparatus 60 is facilitated.

The stage apparatus 60 is further provided with three circular coils: a Z-drive coil (ZA-driver) CZA, a Z-drive coil (ZB-driver) CZB and a Z-drive coil (ZC-driver) CZC which are fixed to the movable stage 61. The Z-drive coil CZA is fixed at a position (middle position) between the pair of Y-drive coils CYA and CYB, and the Z-drive coils CZB and CZC are fixed above the pair of X-drive coils CX, respectively. The Z-drive coil CZA is arranged on the Y-axis, and the Z-drive coils CZB and CZC are arranged to be symmetrical with respect to the Y-axis (at equi-distant positions from the Y-axis). The center of gravity (the center of gravity of the whole) of the Z-drive coils CZA, CZB and CZC is substantially coincident with the center of gravity of the movable stage 61. It is desirable that the Z-drive coils CZA, CZB and CZC be arranged so that a line which connects two of the three Z-drive coils CZA, CZB and CZC extends parallel to one of the X-axis and the Y-axis and so that a line which extends from the remaining one of the three Z-drive coils CZA, CZB and CZC and is orthogonal to the aforementioned connecting line extends parallel to (or aligns with) the other of the X-axis and the Y-axis. In the first embodiment of the stage apparatus, the Z-drive coils CZA, CZB and CZC are arranged so that a line which connects the two Z-drive coils CZB and CZC extends parallel to the X-axis and so that a line which extends from the Z-drive coil CZA and is orthogonal to the aforementioned connecting line aligns with the Y-axis as shown in FIG. 2A. According to this arrangement, manufacture, adjustment and control of the stage apparatus 60 is facilitated.

The pair of X-drive coils CX, the pair of Y-drive coils CYA and CYB and the three Z-drive coils CZA, CZB and CZC are flat (thin) coils which are arranged to be parallel to a plane (X-Y plane) orthogonal to the optical axis O. Each of these seven flat coils is made of a plurality of turns of a conductive wire wound in the X-Y plane which are in turn multi-layered in the thickness direction of the movable stage 61 (i.e., in the Z-direction).

The pair of X-drive coils CX are arranged so that the long portions (long sides) thereof extend parallel to the Y-axis and so that the front and rear surfaces of each X-drive coil CX face the pair of X-direction magnets MX1 and the pair of X-direction magnets MX2, respectively, while the pair of Y-drive coils CYA and CYB are arranged so that the long portions (long sides) thereof extend parallel to the X-axis, so that the front and rear surfaces of the Y-drive coil CYA face the pair of Y-direction magnets MYA1 and the pair of Y-direction magnets MYA2, respectively, and so that the front and rear surfaces of the Y-drive coil CYB face the pair of Y-direction magnets MYB1 and the pair of X-direction magnets MYB2, respectively.

The pair of X-drive coils (X-driver) CX, the Y-drive coil (YA-driver) CYA, the Y-drive coil (YB-driver) CYB, the Z-drive coil (ZA-driver) CZA, the Z-drive coil (ZB-driver) CZB and the Z-drive coil (ZC-driver) CZC are all connected to an actuator drive circuit 42 (see FIG. 1), and the passage of electric current through each of these seven coils is controlled via the actuator drive circuit 42.

Each X-drive coil CX and the associated front and rear pairs of X-direction magnets MX1 and MX2 constitute a second thrust generator which generates thrust in the X-direction (the second direction). The movable stage 61 can be translated in the X-direction by the thrust force in the X-direction which is generated by controlling the current through the pair of X-drive coils CX.

The Y-drive coil CYA and the associated front and rear pairs of Y-direction magnets MYA1 and MYA2, and the Y-drive coil CYB and the associated front and rear pairs of Y-direction magnets MYB1 and MYB2 constitute a pair of third thrust generators (thrust controllers), each of which generates thrust in the Y-direction (the third direction). The movable stage 61 can be translated in the Y-direction and turned (rotated) about the Z-direction by interaction of two thrust forces in the Y-direction which are generated by controlling the currents through the pair of Y-drive coils CYA and CYB, spaced from each other in the X-direction.

The three Z-drive coils CZA, CZB and CZC are arranged so that the front and rear surfaces of the Z-drive coil CZA face the front and rear Z-direction magnets MZA1 and MZA2, respectively, so that the front and rear surfaces of the Z-drive coil CZB face the front and rear Z-direction magnets MZB1 and MZB2, respectively, and so that the front and rear surfaces of the Z-drive coil CZC face the front and rear Z-direction magnets MZC1 and MZC2, respectively. The Z-drive coil CZA and the front and rear Z-direction magnets MZA1 and MZA2, the Z-drive coil CZB and the front and rear Z-direction magnets MZB1 and MZB2, and the Z-drive coil CZC and the front and rear Z-direction magnets MZC1 and MZC2 constitute three first thrust generators, each of which generates thrust in the Z-direction (the first direction). The movable stage 61 is levitated without contacting either the front fixed yoke 62 or the rear fixed yoke 63 (without contacting any of the three pairs of Z-direction magnets MZA1 and MZA2, MZB1 and MZB2, and MZC1 and MZC2), translated in the Z-direction, tilted about the X-direction and tilted about the Y-direction by interaction of three thrust forces in the Z-direction which are generated by controlling the currents through the three Z-drive coils CZA, CZB and CZC.

In addition, the movable stage 61 can be held at the initial position (central position) in a levitation state (neutral state) by interaction of thrust forces in the X-direction and the Y-direction which are generated by controlling the currents through the pair of X-drive coils CX and the pair of Y-drive coils CYA and CYB.

The stage apparatus 60 is provided with two pairs of X-direction Hall elements (magnetic sensors), two pairs of Y-direction Hall elements (magnetic sensors) and three pairs of Z-direction Hall elements (magnetic sensors). More specifically, the stage apparatus 60 is provided with a left pair of X-direction Hall elements HX1 and HX2 (X-position detector HX), a right pair of X-direction Hall elements HX1 and HX2 (X-position detector HX), a left pair of Y-direction Hall elements HYA1 and HYA2 (YA-position detector HXA), a right pair of Y-direction Hall elements HYB1 and HYB2 (YA-position detector HXB), a pair of Z-direction Hall elements HZA1 and HZA2 (ZA-position detector), a pair of Z-direction Hall elements HZB1 and HZB2 (ZB-position detector) and a pair of Z-direction Hall elements HZC1 and HZC2 (ZC-position detector). These Hall elements HX1, HX2, HYA1, HYA2, HYB1, HYB2, HZA1, HZA2, HZB1, HZB2, HZC1 and HZC2 are all fixed to the movable stage 61. The left pair of X-direction Hall elements HX1 and HX2 are positioned in the air-core area of the left X-drive coil CX, and the right pair of X-direction Hall elements HX1 and HX2 are positioned in the air-core area of the right X-drive coil CX. The left pair of Y-direction Hall elements HYA1 and HYA2 are positioned in the air-core area of the left Y-drive coil CYA, and the right pair of Y-direction Hall elements HYB1 and HYB2 are positioned in the air-core area of the right Y-drive coil CYB. The pair of Z-direction Hall elements HZA1 and HZA2 are positioned in the air-core area of the Z-drive coil CZA, the pair of Z-direction Hall elements HZB1 and HZB2 are positioned in the air-core area of the Z-drive coil CZB, and the pair of Z-direction Hall elements HZC1 and HZC2 are positioned in the air-core area of the Z-drive coil CZC. Each pair of X-direction Hall elements HX1 and HX2 are positioned at an approximate center of the associated X-drive coil CX in the Y-direction (the short-side direction of the image sensor 31) and spaced from each other with a predetermined distance therebetween in the X-direction (the long-side direction of the image sensor 31). Each pair of Y-direction Hall elements HYA1 and HYA2, and HYB1 and HYB2 are positioned at an approximate center of the associated Y-drive coil CYA or CYB in the X-direction (the long-side direction of the image sensor 31) and spaced from each other with a predetermined distance therebetween in the Y-direction (the short-side direction of the image sensor 31). Each pair of Z-direction Hall elements HZA1 and HZA2, HZB1 and HZB2, and HZC1 and HZC2 are positioned to lie on the axis of the associated Z-drive coil CZA, CZB or CZC and spaced from each other with a predetermined distance therebetween in the Z-direction.

Each pair of X-direction Hall elements HX1 and HX2 (X-position detector HX), each pair of Y-direction Hall elements HYA1 and HYA2 (YA-position detector HXA) and HYB1 and HYB2 (YA-position detector HXB) and each pair of Z-direction Hall elements HZA1 and HZA2 (ZA-position detector HZA), HZB1 and HZB2 (ZB-position detector HZB) and HZC1 and HZC2 (ZC-position detector HZC) are all connected to a position detection circuit 43 (see FIG. 1).

Each pair of X-direction Hall elements HX1 and HX2 constitute an X-direction position detector (second-direction position detector) which detects the magnetic force of the associated pairs of X-direction magnets MX1 and MX2 (magnetic flux of an X-direction magnetic circuit) to detect the position of the movable stage 61 in the X-direction (the translation direction position in the X-direction) based on detection signals output from the X-direction Hall elements HX1 and HX2.

The pair of Y-direction Hall elements HYA1 and HYA2 detects the magnetic force of the associated pairs of Y-direction magnets MYA1 and MYA2 (magnetic flux of a Y-direction magnetic circuit), and the pair of Y-direction Hall elements HYB1 and HYB2 detects the magnetic force of the associated pairs of Y-direction magnets MYB1 and MYB2 (magnetic flux of a Y-direction magnetic circuit). Subsequently, the position of the movable stage 61 in the Y-direction and the turning position (rotational position) of the movable stage 61 about the Z-direction are detected based on detection signals output from the Y-direction Hall elements HYA1 and HYA2 and detection signals output from the Y-direction Hall elements HYB1 and HYB2. Accordingly, the pair of Y-direction Hall elements HYA1 and HYA2 and the pair of Y-direction Hall elements HYB1 and HYB2 each constitute both a Y-direction position detector (third-direction position detector) which detects the position of the movable stage 61 in the Y-direction (the translation direction position of the movable stage 61 in the Y-direction) and a turning position (rotational position) detector which detects the turning position of the movable stage 61 about the Z-direction.

Each pair of Z-direction Hall elements HZA1 and HZA2, HZB1 and HZB2, and HZC1 and HZC2 detect the magnetic force of the associated pair of Z-direction magnets MZA1 and MZA2, MZB1 and MZB2, or MZC1 and MZC2 (magnetic flux of a Z-direction magnetic circuit) to detect the position of the movable stage 61 in the Z-direction (the translation direction position in the Z-direction), the tilting position of the movable stage 61 about the X-direction and the tilting position of the movable stage 61 about the Y-direction based on detection signals output from the three pairs of Z-direction Hall elements HZA1 and HZA2, HZB1 and HZB2, and HZC1 and HZC2. Accordingly, the three pairs of Z-direction Hall elements HZA1 and HZA2, HZB1 and HZB2, and HZC1 and HZC2 constitute both a Z-direction position detector (translation direction position detector) which detects the position of the movable stage 61 in the Z-direction (the translation direction position in the Z-direction), a tilting position detector which detects the tilting position of the movable stage 61 about the X-direction and a tilting position detector which detects the tilting position of the movable stage 61 about the Y-direction.

The X-drive coils CX, the Y-drive coils CYA and CYB and the Z-drive coils CZA, CZB and CZC, the X-direction Hall elements HX (HX1 and HX2), the Y-direction Hall elements HYA (HYA1 and HYA2) and HYB (HYB1 and HYB2), and the Z-direction Hall elements HZA (HZA1 and HZA2), HZB (HZB1 and HZB2) and HZC (HZC1 and HZC2) are all mounted on a flexible printed circuit (FPC) board (not shown) and are electrically connected to a circuit incorporated in the camera body 11 such as the actuator drive circuit 42 or the position detection circuit 43 via a flexible printed wiring board (flexible PWB) (not shown) which extends from the movable stage 61 (see FIG. 1).

The actuator drive circuit 42 controls energization of the pair of X-drive coils CX, the pair of Y-drive coils CYA and CYB, and the three Z-drive coils CZA, CZB and CZC. The operation of the actuator drive circuit 42 is controlled by the body CPU 20 via an anti-shake control circuit 41 which is connected between the body CPU 20 and the actuator drive circuit 42 as shown in FIG. 1.

The position detection circuit 43 detects the positions of the movable stage 61 in the X-direction, the Y-direction and the Z-direction, the tilting direction of the movable stage 61 about the X-direction (the tilting (rotating) angle/pitch angle about the X-direction), the tilting direction of the movable stage 61 about the Y-direction (the tilting (rotating) angle/yaw angle about the Y-direction) and the turning (rotation) direction of the movable stage 61 about the Z-direction (the turning (rotating) angle/roll angle about the Z-direction) from detection signals output from the X-direction Hall elements HX1 and HX2, the Y-direction Hall elements HYA1 and HYA2, and HYB1 and HYB2 and the Z-direction Hall elements HZA1 and HZA2, HZB1 and HZB2, and HZC1 and HZC2.

The digital camera 10 detects the positions of the movable stage 61 (i.e., the positions of the image sensor 31) in the X-direction, the Y-direction and the Z-direction, the rotational position (tilting position) of the movable stage 61 about the X-direction, the rotational position (tilting position) of the movable stage 61 about the Y-direction, and the rotational position of the movable stage 61 about the Z-direction in a manner which will be discussed thereinafter.

The position detection circuit 43 detects the position (the amount of movement) of the movable stage 61 in the X-direction by performing arithmetic computations based on the sum signal of the detection signals input from the pair of X-direction Hall elements HX1 and HX2.

The position detection circuit 43 detects the position of the pair (left pair) of Y-direction Hall elements HYA1 and HYA2 in the Y-direction by performing arithmetic computations based on the sum signal of the detection signals input from the pair of Y-direction Hall elements HYA1 and HYA2 and detects the position of the pair (right pair) of Y-direction Hall elements HYB1 and HYB2 in the Y-direction by performing arithmetic computations using the detection signals input the pair of Y-direction Hall elements HYB1 and HYB2, e.g., based on the sum signal of the detection signals input from the pair of Y-direction Hall elements HYB1 and HYB2. Based on these two positions in the Y-direction that are spaced from each other in the X-direction, the position detection circuit 43 detects the position (the amount of movement) of the movable stage 61 in the Y-direction and the turning position (the amount of rotation) of the movable stage 61 about the Z-direction.

In addition, the position detection circuit 43 detects the positions of the movable stage 61 in the Z-direction at three different points (detects the position of the movable stage 61 in the Z-direction, the tilting position of the movable stage 61 about the X-direction and the tilting position of the movable stage 61 about the Y-direction) by performing arithmetic computations using detection signals input from the three pairs of Z-direction Hall elements HZA1 and HZA2, HZB1 and HZB2, and HZC1 and HZC2 by performing arithmetic computations, e.g., based on the quotient of the sum of a pair of detection signals and the difference of this pair of detection signals. Thereupon, based on the positions of the movable stage 61 in the Z-direction at the three different points, the position detection circuit 43 detects the position (the amount of movement) of the movable stage 61 in the Z-direction, the tilting position (rotation position) of the movable stage 61 about the X-direction and the tilting position (rotation position) of the movable stage 61 about the Y-direction.

In the above illustrated embodiment of the stage apparatus, the position detection accuracy in the X-direction and the Y-direction does not fluctuate even when the movable stage 61 moves in the Z-direction because the pair of X-direction Hall elements HX1 and HX2 that detect the position of the movable stage 61 in the X-direction are provided at a predetermined distance therebetween in the X-direction, because the pair of Y-direction Hall elements HYA1 and HYA2 that detect the position of the movable stage 61 in the Y-direction are provided at a predetermined distance therebetween in the Y-direction, and because the pair of Y-direction Hall elements HYB1 and HYB2 that detect the position of the movable stage 61 in the Y-direction are provided at a predetermined distance therebetween in the Y-direction.

The position detection accuracy in the Z-direction does not deteriorate even when the movable stage 61 translates in the X-direction or the Y-direction or tilts about the X-direction or the Y-direction because each of the three pairs of Z-direction Hall elements HZA1 and HZA2, HZB1 and HZB2, and HZC1 and HZC2 that detect the position of the movable stage 61 in the Z-direction are provided at a predetermined distance between the pair of Hall elements in the Z-direction.

Under control of the body CPU 20, the digital camera 10 levitates the movable stage 61 in between the front fixed yoke 62 and the rear fixed yoke 63 by controlling energization of the pair of X-drive coils CX, the pair of Y-drive coils CYA and CYB and the three Z-drive coils CZA, CZB and CZC via the actuator drive circuit 42 based on the positions calculated by the position detection circuits 43.

In addition, based on each of the above described positions of the movable stage 61 calculated by the body CPU 20 (the position detection circuit 43), in a state in which the movable stage 61 is levitated, the digital camera 10 is capable of controlling the six degrees of freedom of movement of the movable stage 61 (the image sensor 31) in a manner which will be discussed hereinafter.

The movable stage 61 can be held at a predetermined position in the optical axis direction and be translated in the Z-direction by interaction of three thrust forces of the same magnitude in the Z-direction which are generated by equally controlling the currents through the three Z-drive coils CZA, CZB and CZC, and the movable stage 61 can be tilted about the X-direction and also tilted about the Y-direction, and held thereat, by interaction of three thrust forces of different magnitudes in the Z-direction which are generated by individually controlling the currents through the three Z-drive coils CZA, CZB and CZC.

The movable stage 61 can be translated in the X-direction with thrust forces in the X-direction which are generated by controlling the current through each X-direction drive coil CX, and held at a predetermined position in the X-direction.

The movable stage 61 can be held at a predetermined position in the Y-direction and translated in the Y-direction by interaction of two thrust forces of the same magnitude in the Y-direction which are generated by equally controlling the currents through the two Y-drive coils CYA and CYB, and the movable stage 61 can be turned (rotated) about the Z-direction, and held thereat, by interaction of two thrust forces of different magnitudes in the Y-direction which are generated by individually controlling the currents through the two Y-drive coils CYA and CYB.

Hence, the movable stage 61 can be translated, tilted/turned, tilted/turned while being translated, translated after being tilted/turned, and tilted/turned after being translated in all six directions with six degrees of freedom (6DoF) by interaction of thrust forces in the Z-direction, thrust forces in the X-direction and thrust forces in the Y-direction which are generated by all the above described drive coils: the X-drive coils CZA, CZB and CZC, the X-drive coil(s) CX and the Y-drive coils CYA and CYB.

The body CPU 20 performs an image shake correction (shake reduction) operation by performing the above described drive control operations for the movable stage 61 in synchronization with shaking (vibrations) (caused by hand shake) of the camera body 11 which is detected by the camera shake detecting circuit 44.

According to the present embodiment of the stage apparatus, since each pair of X-direction magnets MX1 and the associated pair of X-direction magnets MX2 (which are fixed to the front fixed yoke 62 and the rear fixed yoke 63, respectively) are positioned so that opposite magnetic poles of these magnets face each other with the long portions (long sides) of the associated X-drive coil CX positioned therebetween, since the pair of Y-direction magnets MYA1 and the pair of Y-direction magnets MYA2 (which are fixed to the front fixed yoke 62 and the rear fixed yoke 63, respectively) are positioned so that opposite magnetic poles of these magnets face each other with the long portions (long sides) of the associated Y-drive coil CYA positioned therebetween and since the pair of Y-direction magnets MYB1 and the pair of Y-direction magnets MYB2 (which are fixed to the front fixed yoke 62 and the rear fixed yoke 63, respectively) are positioned so that opposite magnetic poles of these magnets face each other with the long portions (long sides) of the associated Y-drive coil CYB positioned therebetween, the magnetic field lines can be made to be substantially orthogonal to the direction of the optical axis O (the Z-axis/the first direction), and accordingly, the thrust forces (driving forces) in the X-direction and the Y direction for the movable stage 61 fluctuates little even if the movable stage 61 moves in the Z-direction.

The thrust force (driving force) for the movable stage 61 fluctuates little even if the Z-direction drive coils CZA, CZB and CZC (the movable stage 61) move in the Z-direction because each Z-direction magnet MZA1, MZB1 and MZC1 on the front fixed yoke 62 and the associated Z-direction magnet MZA1, MZB1 or MZC1 on the rear fixed yoke 63 are positioned so that the same magnetic poles of these magnets face each other with the associated ring-shaped Z-drive coil CZA, CZB or CZC on the movable stage 61 positioned therebetween.

In the above illustrated embodiment of the stage apparatus, the thrust generators can be configured to be compact in size within a narrow area because the Z-drive coil (ZA-driver) CZA, which is provided as an element of one of the three Z-direction thrust generators, is positioned on the movable stage 61 at a position between the pair of Y-drive coils CYA and CYB, which constitute elements of the two Y-direction (the third) thrust generators.

In the above illustrated embodiment of the stage apparatus, since the center of gravity of the Z-drive coils (the ZA-driver, the ZB-driver and the ZC-driver) CZA, CZB and CZC, which serve as a plurality of Z-direction thrust generators (the first thrust generators), is substantially coincident with the center of gravity of the movable stage 61, the thrust forces of the Z-direction thrust generators can be equalized, which allows the thrust force (driving force) of each Z-direction thrust generator to be set to a small value.

The above described arrangement of the three Z-drive coils (the ZA-driver, the ZB-driver and the ZC-driver) CZA, CZB and CZC (which constitute elements of a plurality of Z-direction thrust generators) in which a line which connects two of the three Z-drive coils CZA, CZB and CZC (the Z-drive coils CZB and CZC in this particular embodiment) extends parallel to one of the X-axis and the Y-axis and a line which extends from the remaining one of the three Z-drive coils CZA, CZB and CZC and is orthogonal to the aforementioned connecting line extends parallel to (or coincides with) the other of the X-axis and the Y-axis makes it possible to make the detection axis and the control axis of a gyro sensor coincide with each other, which makes it possible to simplify the configuration of the control system. For instance, tilting of the movable stage 61 about the Y-direction can be controlled by the difference between thrust forces generated by the ZC-driver and the ZB-driver, while turning of the movable stage 61 about the Z-direction can be controlled by the ZA-driver.

Figure 6:
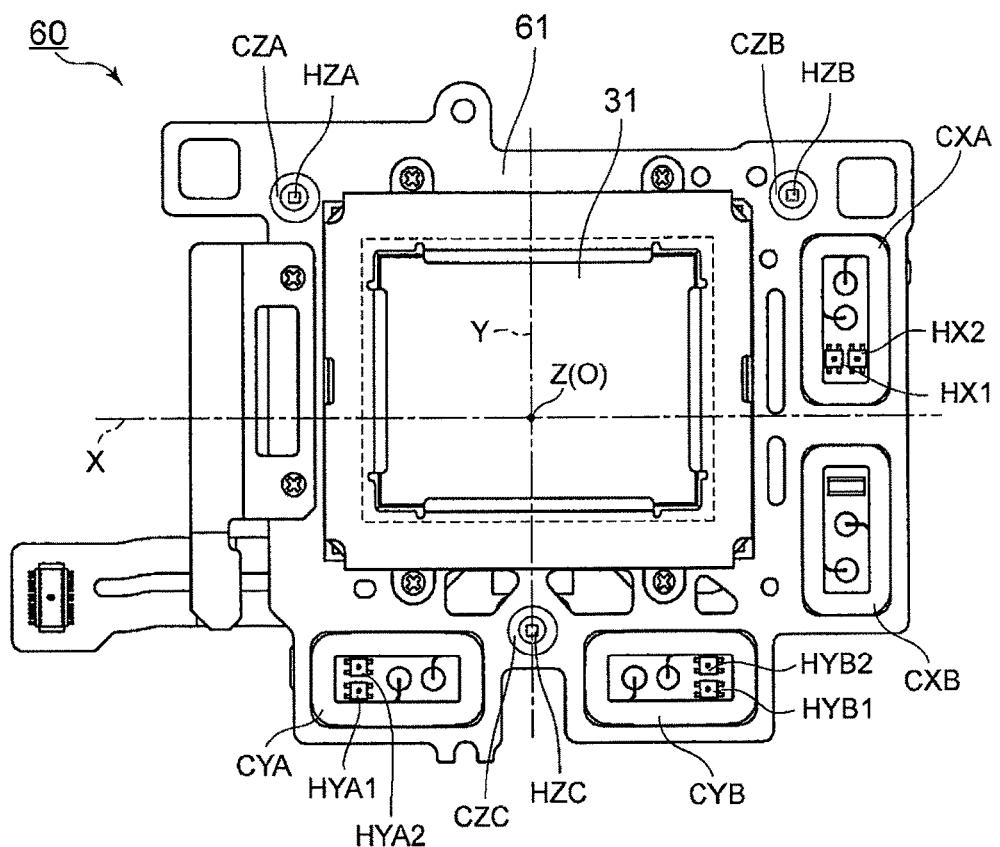
FIG. 6 is a rear elevational view of another embodiment of the stage apparatus.

In the above illustrated embodiment of the stage apparatus, the pair of X-drive coils CX that are identical in specification are provided on either side of the image sensor 31 of the movable stage 61 in the X-direction to be located to the left and right of the left and right sides (short sides) of the image sensor 31, respectively, the left pair of X-direction magnets MX1 and the right pair of X-direction magnets MX1, each pair being made of two permanent magnets identical in specification, are provided on either side of the opening 62a of the front fixed yoke 62 in the leftward and rightward directions, and the left pair of X-direction magnets MX2 and the right pair of X-direction magnets MX2, each pair being made of two permanent magnets identical in specification, are provided on either side of the opening 63a of the rear fixed yoke 63 in the leftward and rightward directions. However, all the X-direction magnets MX1 and MX2 and the pair of X-drive coils CX can be provided only on one of the left and right sides of the opening 62a. FIG. 6 shows an embodiment of the stage apparatus having such a structure. FIG. 6 is a rear elevational view of this embodiment (second embodiment) of the stage apparatus 60. Elements of the second embodiment of the stage apparatus which are similar to those of the embodiment of the stage apparatus shown in FIGS. 2A through 5 are designated by the same reference numerals, and descriptions of these similar elements are omitted.

The stage apparatus 60 is provided with a pair of X-drive coils (upper and lower X-drive coils) CXA and CXB which are identical in specification. The pair of X-drive coils CXA and CXB are aligned in the Y-direction and arranged on she right-hand side of the image sensor 31 at upper and lower positions with respect to the X-axis to be spaced from each other in the Y-direction with the longitudinal direction of each X-drive coil CXA and CXB extending parallel to the Y-axis. The second embodiment of the stage apparatus 60 is provided in the air-core area of the upper X-drive coil CXA with a pair of X-direction Hall element (X-position detector)

HX1 and HX2. Although not shown in FIG. 6, an upper pair of X-direction magnets (left and right X-direction magnets) and a lower pair of X-direction magnets (left and right X-direction magnets), each pair being made of two permanent magnets identical in specification, are arranged on portions of the front fixed yoke (not shown in FIG. 6) which face the upper X-drive coil CXA and the lower X-drive coil CXB, respectively, and another upper pair of X-direction magnets (left and right X-direction magnets) and another lower pair of X-direction magnets (left and right X-direction magnets), each pair being made of two permanent magnets identical in specification, are arranged on portions of the rear fixed yoke (not shown in FIG. 6) which face the upper X-drive coil CXA and the lower X-drive coil CXB, respectively, to form upper and lower magnetic circuits which constitute thrust generators that generate thrust in the X-direction. In this embodiment, a thrust force in the X-direction is generated by interaction of thrust forces in the X-direction which are generated by performing the same energization control on the pair of X-drive coils CXA and CXB, which makes it possible to translate the movable stage 61 in the X-direction.

The stage apparatus can be provided with only one X-drive coil. In such a case, it is desirable that the X-drive coil be positioned to lie on the X-axis.

In the above illustrated embodiments, the drive coils are mounted to the movable stage (movable member), while the permanent magnets are mounted to fixed yokes (base members). However, in a stage apparatus according to the present invention, it is possible for the drive coils and the permanent magnets to be mounted to fixed yokes (base members) and the movable stage (movable member), respectively.

Figure 7:
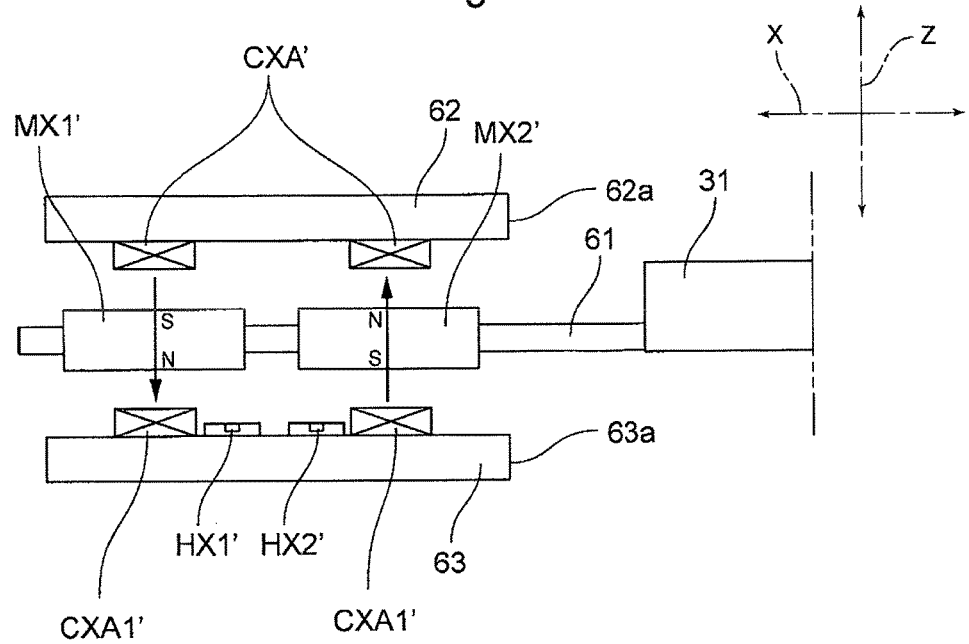
FIG. 7 is an enlarged sectional view of one of a pair of X-drivers of yet another embodiment of the stage apparatus.
Figure 8:
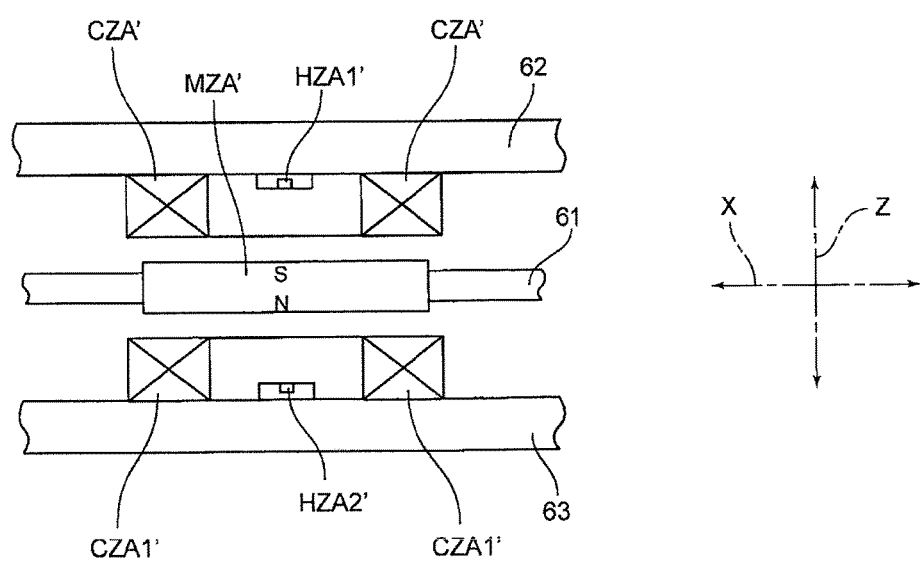
FIG. 8 is an enlarged sectional view of a Z-driver in the embodiment of the stage apparatus shown in FIG. 7.

FIGS. 7 and 8 show another embodiment (third embodiment) of the stage apparatus, in which the drive coils are mounted to the front and rear fixed yokes (base members) while the permanent magnets are mounted to the movable stage (movable member). FIGS. 7 and 8 are sectional views taken at the same position as the sectional views shown in FIGS. 3 and 4. Elements of the third embodiment of the stage apparatus which are similar to those of the embodiments of the stage apparatuses shown in FIGS. 2A through 5 are designated by the same reference numerals, and descriptions of these similar elements are omitted.

An X-drive coil CXA' and a Z-drive coil CZA' are fixed to the front fixed yoke 62, while an X-drive coil CXA1' and a Z-drive coil CZA1' are fixed to the rear fixed yoke 63 at positions facing the X-drive coil CXA' and the Z-drive coil CZA', respectively. A pair of X-direction magnets MX1' and MX2', which are fixed to the movable stage 61, are positioned between the X-drive coil CXA1' and the X-drive coil CXA'. A Z-direction magnet MZA', which is fixed to the movable stage 61, is positioned between the X-drive coil CZA1' and the X-drive coil CZA'.

A pair of X-direction Hall elements (X-position detector) HX1' and HX2' are fixed to at least one of the front fixed yoke 62 and the rear fixed yoke 63, specifically fixed to the rear fixed yoke 63 and positioned in the air-core area of the X-drive coil CXA1' in this particular embodiment (see FIG. 7). A Z-direction Hall element (Z-position detector) HZA1' is fixed to the front fixed yoke 62 and positioned in the air-core area of the Z-drive coil CZA', and a Z-direction Hall element (Z-position detector) HZA2' is fixed to the rear fixed yoke 63 and positioned in the air-core area of the Z-drive coil CZA1' (see FIG. 8). A front and rear pair of Y-drive coils (not shown) are fixed to the front fixed yoke 62 and the rear fixed yoke 63, respectively, a pair of Y-direction Hall elements (not shown) are fixed to one of the front fixed yoke 62 and the rear fixed yoke 63 and positioned in the air-core area of the Y-drive coil which is fixed to this one fixed yoke 62 or 63, and a pair of Y-direction magnets (not shown) are fixed to the movable stage 61 to be positioned between the pair of Y-drive coils that face each other.

In the third embodiment of the stage apparatus, the movable stage 61 is levitated, translated, tilted/turned, translated while being tilted/turned, or tilted/turned and thereupon translated while maintaining the tilted/turned state by controlling the currents through the X-drive coils CXA' and CXA1', the Z-drive coils CZA' and CZA1' and the pair of Y-drive coils (not shown).

In the third embodiment of the stage apparatus, the capabilities of detecting the position of the movable stage 61 in the X-direction based on the detection signals output from the Z-direction Hall sensors HX1' and HX2' and precisely detecting (the image sensor 31) the translation position of the movable stage 61 in the Z-direction, the tilting position of the movable stage 61 about the X-direction and the tilting position of the movable stage 61 about the Y-direction are the same as those of the embodiments shown in FIGS. 2A through 6.

In the third embodiment of the stage apparatus, all the drive coils and Hall elements are fixed to the front fixed yoke 62 and the rear fixed yoke 63 that are base members, and all the permanent magnets (drive magnets) are fixed to the movable stage 61 that is a movable member. This structure reduces the number of flexible PWBs extended from the movable stage 61, so that the load of the flexible PWB (s) on the movable stage 61 is reduced, which improves responsiveness of the movable stage 61, thus making it possible to drive the movable stage 61 with high precision. The structure in which the drive coils and the Hall elements are fixed to the front fixed yoke 62 and the rear fixed yoke 63 while the permanent magnets (drive magnets) are fixed to the movable stage 61 can be applied to all the above illustrated embodiments.

In the above illustrated first through third embodiments, the first direction is defined as the Z-direction (the Z-axis) that is parallel to the optical axis O, and the second direction and the third direction are defined as the X-direction (the X-axis) and the Y-direction (the Y-axis), respectively, which are orthogonal to the Z-direction (the Z-axis). However, in the present invention, the first direction does not necessarily have to be parallel to the optical axis O, and the first, second and third directions do not necessarily have to be orthogonal to one another; each can be set to an arbitrary direction.

Although a Hall element, as an X-direction position detector, is installed in the air-core area of each of the left and right X-drive coils CX in the above illustrated first and second embodiments, a Hall element can be installed only in one of the air-core areas of the left and right X-drive coils CX.

In addition, a pair of Hall elements (HX1 and HX2, HYA1 and HYA2, HYAB1 and HYA2, HZA1 and HZA2, HZB1 and HZB2, or HZC1 and HZC2) are installed in the air-core area of each drive coil (except the drive coil CXB shown in FIG. 6) but can be installed outside the drive coil. In addition to each Hall element detecting the magnetic force of the associated pair of drive magnets in the above illustrated embodiments, it is possible for the stage apparatus to be provided, independently of the drive magnets, with an additional permanent magnet(s) for use in magnetic force detection so that the Hall element detects the magnetic force of this additional permanent magnet(s) instead. Furthermore, each Hall element can be replaced by a different type of magnetic sensor.

The digital camera 10 equipped with one of the above illustrated first through sixth embodiments of the stage apparatuses according to the present invention has a contrast detection type AF (autofocus) function as an AF function. According to this contrast detection type function, the AF unit 22 detects the contrast of an object via the contrast detector 35 while driving the focusing optical system of the photographic lens 101 in the optical axis direction and detects an in-focus state in which the contrast becomes maximum to bring the object into focus. In the digital camera 10, in addition to an image shake correction operation, a fine focus adjustment can be performed in an AF operation with the stage apparatus 60 by finely moving (translating) the image sensor 31 in the optical axis direction; additionally, it is possible to detect a peak contrast by wobbling the image sensor 31 using the stage apparatus 60. Additionally, in the digital camera 10, the stage apparatus 60 makes a special photography such as a tilt photography in which the image sensor 31 is tilted with the stage apparatus 60 possible, and facilitates composition adjustment by performing tilting, panning or rolling operation.

The stage apparatus according to the present invention can be applied to various optical apparatuses such as a digital camera, an interchangeable lens and a camera-integrated lens. For instance, the stage apparatus according to the present invention can also be incorporated in a projector (image projector apparatus) which project images (still/moving images) and data, etc. In the case where the stage apparatus 60 is incorporated in a projector, the projector can be provided at an approximate center of the movable stage 61 with an image-forming element (LCD panel/driven member) which allows projection light to be incident thereon from one side (the rear) of the LCD panel in the thickness direction of the movable stage 61 (the first direction/the Z-direction) and to emerge from the LCD panel to travel toward an projector optical system provided on the other side (the front) of the movable stage, or the projector can be provided at an approximate center of the movable stage 61 with a DMD (digital mirror device) panel (projection panel) which reflects the incident projection light, which is incident thereon from a direction different from the first direction (the Z-direction), in the first direction (toward the projector optical system). Alternatively, a projector optical system can be mounted on the movable stage 61 instead of the image-forming element.

Figure 9:
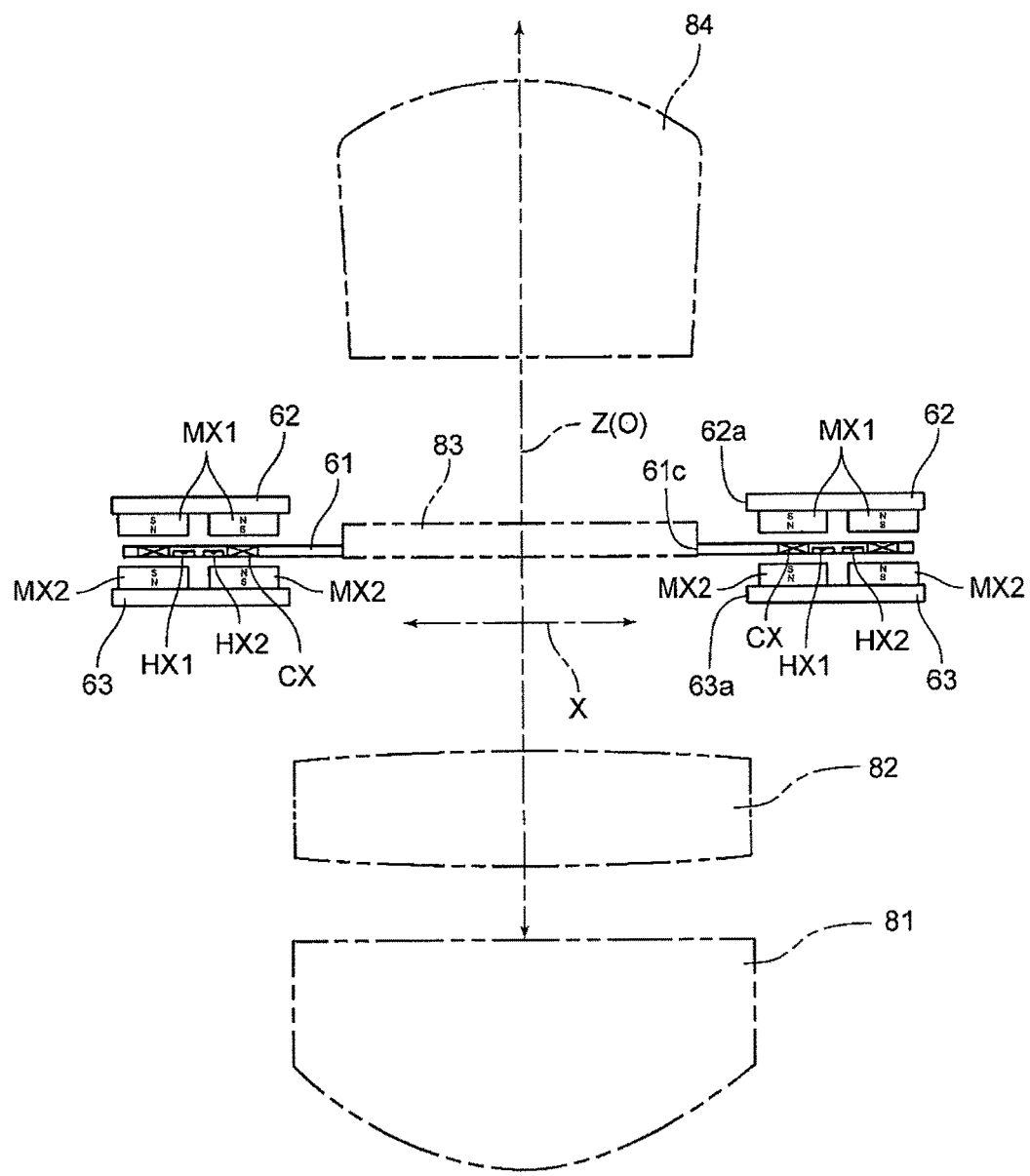
FIG. 9 is a sectional view, corresponding to the sectional view of FIG. 2B, of an embodiment of an image projector apparatus, according to the present invention.
Figure 10:
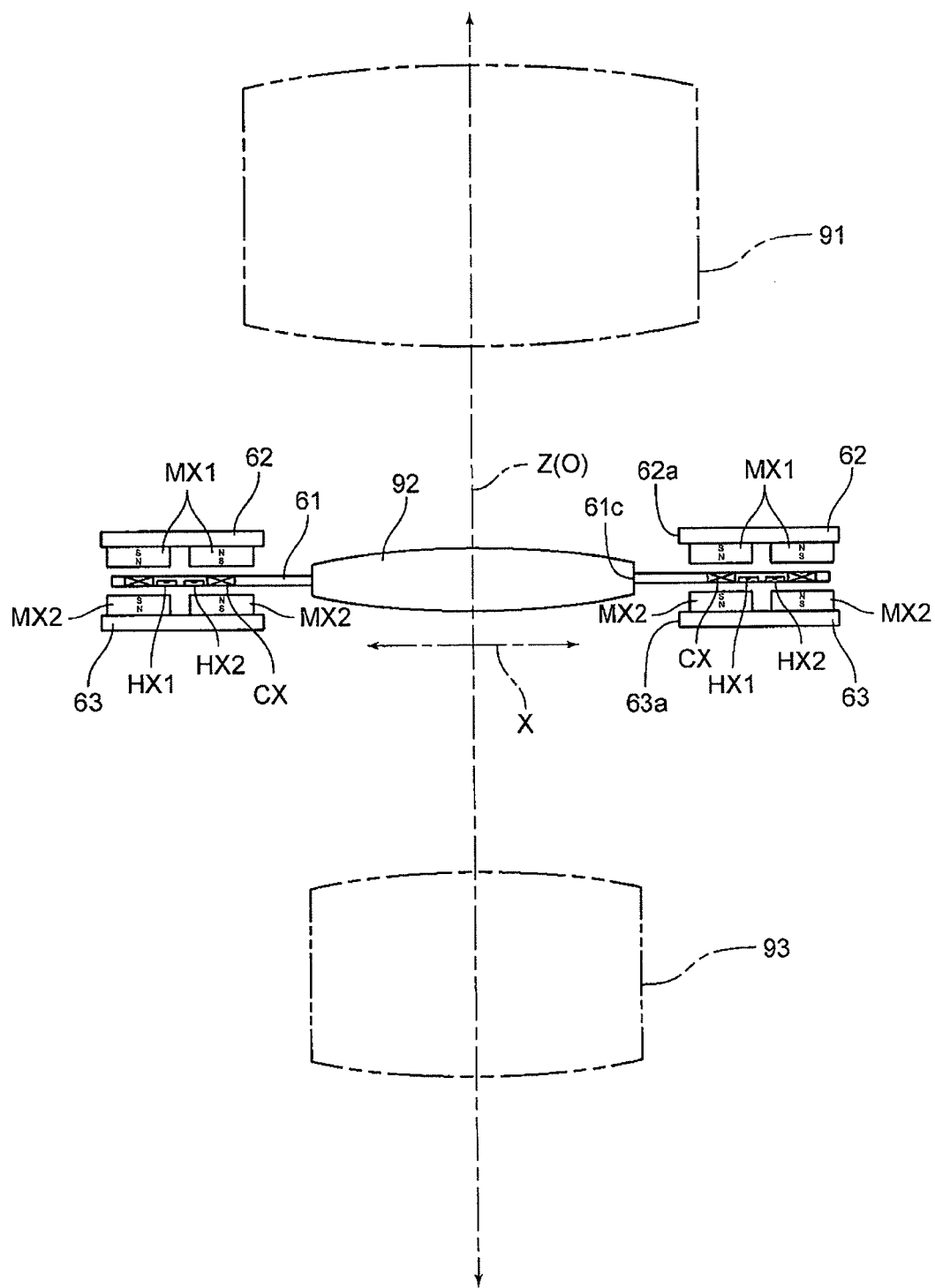
FIG. 10 is a sectional view, corresponding to the sectional view of FIG. 2B, of an embodiment of a hand-shake correction device (image stabilizer), according to the present invention.

As shown in FIG. 9, the projector equipped with the stage apparatus 60, having the movable stage 61, is provided with a light source 81, an illumination optical system 82 which enables a uniform distribution of light emitted from the light source 81, an image-forming element 83 which forms an image upon receiving illumination light which emerges from the illumination optical system 82, the movable stage 61 on which the image-forming element 83 is mounted in an opening 61c, and the aforementioned projector optical system 84, which projects the image formed by the image-forming element 83. Specific examples of the image-forming element 83 are an LCD panel or a DMD panel. The image-forming element 83 is installed onto a housing of the projector or the projector optical system 84 via the movable stage 61. The image-forming element 83 is positioned inside the projector so that a plane on which the image formed by the image-forming element 83 is formed is orthogonal to the optical axis O of the projector optical system 84 or the optical axis of any one of the lens elements of the projector optical system 84 in a state where the movable stage 61 is not driven (when the movable stage 61 is held at the initial position). The projecting direction and the projection position can be adjusted by changing the direction of the projection light which travels toward the projector optical system 84 after passing through the LCD panel or changing the direction of the projection light which is reflected by the DMD panel to travel toward the projector optical system 84, or adjusting the orientation of the projection image by translating the movable stage 61 in the Z-direction (first direction), X-direction (second direction) and/or the Y-direction (third direction) and/or rotating (turning) the movable stage 61 about the Z-direction (first direction) and/or rotating (tilting) the movable stage 61 about the X-direction (second direction) and/or the Y-direction (third direction), and the focus state can be adjusted by adjusting the distance between the projector optical system 84 and the LCD panel or the DMD panel.

The present invention can be applied to various imaging apparatuses such as a so-called mirrorless digital camera, an SLR digital camera, a compact digital camera and a digital video camera (camcorder) which have the capability of moving an image sensor. In addition, the present invention can also be applied to not only imaging apparatuses but also projectors which project images (still/moving images), data, etc.

The stage apparatus of the present invention can also be applied to a lens barrel (e.g., a lens barrel disclosed in Japanese Unexamined Patent Publication No. 2015-4769) provided with an image-correction optical system in which one optical element of a photographing optical system is driven. For example, in the photographic lens 101, one or a plurality of optical elements of the photographing optical system can serve as a correction optical element (driven member). In this alternative embodiment shown in FIG. 10, a lens element (driven member) serving as a correction optical element 92 is provided between a first lens group 91 and a second lens group 93. The correction optical element 92 is mounted in an opening 61c formed in the approximate center of the movable stage 61. According to the present embodiment, hand-shake correction (image stabilization) and a special photographic effect such as swing and tilt photography by translating the movable stage 61 (correction optical element 92) in the Z-direction (optical axis O direction/first direction), the X-direction (second direction) and/or the Y-direction (third direction), and/or turning (rotating) the movable stage 61 (correction optical element 92) about the Z-direction (first direction), and/or tilting (rotating) the movable stage 61 (correction optical element 92) about the X-direction (second direction) and/or Y-direction (third direction). Furthermore, in the present embodiment, it is possible to carrying out a fine focusing adjustment by finely translating the movable stage 61 (correction optical element 92) in the Z-direction (optical axis O direction/first direction).

Furthermore, the digital camera 10, to which the present invention is applied, can carry out hand-shake correction (image stabilization) and/or a special photographic effect by a combined operation of a hand-shake correction device provided in the photographic lens 101 and a hand-shake correction device provided in the camera body 11.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A stage apparatus comprising:
a base;
a movable stage configured to move relative to said base;
a plurality of magnetic first thrust generation circuits configured to generate thrust forces in a first direction against said movable stage; and
a position detector comprising permanent magnets fixed to one of said movable stage and said base, and further comprises pairs of magnetic sensors including at least one pair of first-direction magnetic sensors configured to detect a magnetic force of a first-direction permanent magnet of said permanent magnets, said pairs of magnetic sensors fixed to the other of said movable stage and said base while being spaced from each other with a predetermined distance therebetween in said first direction, the position detector configured to detect a translation position and a rotational position of said movable stage relative to said base,
wherein an interaction of said thrust forces in said first direction causes said movable stage to at least one of:
translate relative to said base in said first direction,
rotate relative to said base about a direction different from said first direction,
translate relative to said base in said first direction while rotating relative to said base about the direction different from said first direction, and
translate relative to said base in said first direction after rotating relative to said base about the direction different from said first direction,
and
wherein said position detector is configured to detect said translation position of said movable stage relative to said base based on a pair of detection signals input from said pair of first-direction magnetic sensors.

2. The stage apparatus according to claim 1, further comprising a magnetic second thrust generation circuit and a magnetic third thrust generation circuit which generate thrust forces in a second direction and a third direction, respectively, that are mutually different and different from said first direction,
wherein an interaction of said thrust forces in said second direction and said third direction causes said movable stage to at least one of:
translate in said second direction,
translate in said third direction, and
rotate about said first direction,
wherein said permanent magnets includes a second-direction permanent magnet,
wherein said pairs of magnetic sensors include at least one pair of second-direction magnetic sensors which are fixed to said other of said movable stage and said base and spaced from each other with a predetermined distance therebetween in said second direction to detect magnetic force of said second-direction permanent magnet,
wherein said pairs of magnetic sensors include at least one pair of third-direction magnetic sensors which are fixed to said other of said movable stage and said base and spaced from each other with a predetermined distance therebetween in said third direction to detect magnetic force of said third-direction permanent magnet,
wherein said position detector detects a translation position of said movable stage in said second direction based on a pair of detection signals input from said pair of second-direction magnetic sensors, and
wherein said position detector detects a translation position of said movable stage in said third direction based on a pair of detection signals input from said pair of third-direction magnetic sensors.

3. The stage apparatus according to claim 2, wherein at least one of said second thrust generation circuit and said third thrust generation circuit comprises at least two thrust generation circuits, and
wherein said movable stage can be rotated about said first direction by interaction of said thrust forces in one of said second direction and said third direction generated by said at least two thrust generation circuits.

4. The stage apparatus according to claim 3, wherein a plurality of the position detectors that are each configured of said pair of second-direction magnetic sensors detect said rotational position of said movable stage about said first direction based on detection signals input from said pairs of second-direction magnetic sensors of said plurality of position detectors.

5. The stage apparatus according to claim 3, wherein a plurality of the position detectors that are configured of said pair of third-direction magnetic sensors detect said rotational position of said movable stage about said first direction based on detection signals input from said pairs of third-direction magnetic sensors of said plurality of position detectors.

6. The stage apparatus according to claim 2, wherein a driven component having a flat front surface and a low-profile shape is fixed to said movable stage,
wherein said first direction is orthogonal to said flat front surface, and
wherein said second direction and said third direction are orthogonal to each other, orthogonal to said first direction, and parallel to said flat front surface.

7. The stage apparatus according to claim 6, wherein said base comprises a front fixed yoke and a rear fixed yoke which face said movable stage from front and rear thereof, respectively,
wherein said thrust generation circuits comprise a plurality of drive coils fixed to one of said movable stage and the front and rear fixed yokes, and a plurality of permanent magnets fixed to the other of said movable stage and the front and rear fixed yokes, and
wherein said pairs of magnetic sensors are positioned in air-core areas of said drive coils to detect magnetic force of said permanent magnets fixed to said other of said movable stage and the front and rear fixed yokes.

8. The stage apparatus according to claim 7, wherein said first thrust generation circuits comprise drive coils and permanent magnets arranged at least three substantially equi-distant positions outside of said driven component in a radial direction from an axis extending through a center of said driven component in said first direction, and circumferentially arranged at equi-angular intervals about said axis.

9. The stage apparatus according to claim 8, wherein said drive coils comprise circular and flat drive coils which are fixed to said movable stage, and
wherein each pair of said pairs of first-direction magnetic sensors are positioned in said air-core area of associated one of said circular and flat drive coils to be spaced from each other with a predetermined distance therebetween in said first direction.

10. The stage apparatus according to claim 8, wherein said drive coils comprise circular and flat drive coils which are fixed to said front fixed yoke and said rear fixed yoke, and
wherein each pair of said pairs of first-direction magnetic sensors are positioned in said air-core areas of associated two of said circular and flat drive coils which are fixed to said front fixed yoke and said rear fixed yoke, respectively.

11. The stage apparatus according to claim 9, wherein said permanent magnets are arranged on said front fixed yoke and said rear fixed yoke so that same magnetic poles of said permanent magnets are placed face-to-face.

12. The stage apparatus according to claim 8, wherein said position detector detects a position of said movable stage in said first direction and a tilting position of said movable stage about one of said second direction and said third direction based on the quotient of the sum of a pair of detection signals of said pairs of first-direction magnetic sensors and the difference between said pair of detection signals.

13. The stage apparatus according to claim 7, wherein said drive coils and said permanent magnets of each of said second thrust generation circuit and said third thrust generation circuit are positioned outside of said driven component in a radial direction from an axis extending through a center of said driven component in said first direction, wherein each said drive coils of said second thrust generation circuit includes a first elongated flat drive coil elongated in a direction orthogonal to said second direction, wherein said permanent magnets of said second thrust generation circuit, which face said drive coils of said second thrust generation circuit, each include two plate-like permanent magnets which extend parallel to each other in said elongated direction of said first elongated flat drive coil and are spaced from each other in a short-side direction of said first elongated flat drive coil, wherein each said drive coils of said third thrust generation circuit includes a second elongated flat drive coil elongated in a direction orthogonal to said third direction, wherein said permanent magnets of said third thrust generation circuit, which face said drive coils of said third thrust generation circuit, each include two plate-like permanent magnets which extend parallel to each other in said elongated direction of said second elongated flat drive coil and are spaced from each other in a short-side direction of said second elongated flat drive coil, wherein said pair of second-direction magnetic sensors are positioned in said air-core area of said first elongated flat drive coil to be spaced from each other with a predetermined distance therebetween in said short-side direction of said first elongated flat drive coil, and wherein said pair of third-direction magnetic sensors are positioned in said air-core area of said second elongated flat drive coil to be spaced from each other with a predetermined distance therebetween in said short-side direction of said second elongated flat drive coil.

14. The stage apparatus according to claim 13, wherein said position detector detects a position of said movable stage in said second direction based on the sum of a pair of detection signals input from said pair of second-direction magnetic sensors, and wherein said position detector detects a position of said movable stage in said third direction based on the sum of a pair of detection signals input from said pair of third-direction magnetic sensors.

15. The stage apparatus according to claim 13, wherein at least one of said second thrust generation circuit and said third thrust generation circuit comprises a pair of thrust generation circuits spaced from each other in a direction orthogonal to one of said second direction and said third direction, and wherein said position detector detects said rotational position of said movable stage about said first direction based on the sum of detection signals input from one of said pair of second-direction magnetic sensors and said pair of third-direction magnetic sensors and the sum of detection signals input from the other of said pair of second-direction magnetic sensors and said pair of third-direction magnetic sensors.

16. The stage apparatus according to claim 7, wherein said drive coils and said pairs of magnetic sensors are mounted to said movable stage, and wherein said permanent magnets are mounted to said front fixed yoke and said rear fixed yoke.

17. The stage apparatus according to claim 7, wherein said drive coils are positioned to face said front fixed yoke and said rear fixed yoke, wherein said pairs of magnetic sensors are positioned in said air-core areas of said drive coils fixed to one of said front fixed yoke and said rear fixed yokes, and wherein said permanent magnets are fixed to said movable stage.

18. The stage apparatus according to claim 1, wherein said movable stage is levitated in a noncontact state with said base by interaction of said thrust forces in said different directions.

* * * * *